United States Patent
Söllner

(10) Patent No.: US 10,156,651 B2
(45) Date of Patent: Dec. 18, 2018

(54) METHODS AND SYSTEMS TO SOURCE DEGHOST AND SOURCE DESIGNATURE MARINE SEISMIC DATA

(71) Applicant: PGS Geophysical AS, Oslo (NO)

(72) Inventor: Walter Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 199 days.

(21) Appl. No.: 15/135,293

(22) Filed: Apr. 21, 2016

(65) Prior Publication Data
US 2016/0313465 A1    Oct. 27, 2016

Related U.S. Application Data

(60) Provisional application No. 62/150,366, filed on Apr. 21, 2015.

(51) Int. Cl.
  *G01V 1/36* (2006.01)
  *G01V 1/38* (2006.01)
  *G01V 1/32* (2006.01)
  *G01V 1/18* (2006.01)

(52) U.S. Cl.
  CPC ............ *G01V 1/364* (2013.01); *G01V 1/38* (2013.01); *G01V 1/189* (2013.01); *G01V 1/325* (2013.01); *G01V 1/366* (2013.01); *G01V 2210/121* (2013.01); *G01V 2210/1293* (2013.01); *G01V 2210/1423* (2013.01); *G01V 2210/44* (2013.01); *G01V 2210/45* (2013.01); *G01V 2210/56* (2013.01)

(58) Field of Classification Search
  CPC .......... G01V 1/364; G01V 1/38; G01V 1/189; G01V 1/325; G01V 1/366; G01V 2210/121; G01V 2210/1293; G01V 2210/1423; G01V 2210/44; G01V 2210/45; G01V 2210/56
  USPC ........................................................ 367/24
  See application file for complete search history.

(56) References Cited

FOREIGN PATENT DOCUMENTS

EP    2375268 A1 *  10/2011    ............. G01V 1/362

OTHER PUBLICATIONS

Morse, and Feshbach, "Methods of Theoretical Physics," Part I: Chapters 1 to 8, McGraw-Hill Book Company, 1953, pp. 834-857.
(Continued)

*Primary Examiner* — Daniel L Murphy

(57) ABSTRACT

Methods and systems to remove source wavefield and source ghost effects from marine seismic data are described. The methods and systems may be used to substantially remove source wavefield and source ghost effects from marine seismic data collected in rough weather conditions.

19 Claims, 23 Drawing Sheets

(56) References Cited

OTHER PUBLICATIONS

Weglein, Arthur B., et al., "Wavelet estimation for a multidimensional acoustic or elastic earth," Geophysics, vol. 55, No. 7, Jul. 1990, pp. 902-913.
Fokkema, J.T., et al., Seismic applications of acoustic reciprocity, Chapter 11, Elsevier Science Publication Company, Inc., 1993, pp. 215-231.
Osen, Are, et al., "Wavelet estimation from marine pressure measurements," Geophysicas, vol. 63, No. 6, Nov.-Dec. 1998, pp. 2108-2119.
Amundsen, Lasse, "Elimination of free-surface related multiples without need of the source wavelet," Geophysicas, vol. 66, No. 1, Jan.-Feb. 2001, pp. 327-341.
Weglein, A.B., et al., "New approaches to deghosting towed-streamer and ocean-bottom pressure measurements," SEG Int'l Exposition and 72nd Annual Meeting, Oct. 6-11, 2002.
Wapennar, Kees, et al., "Seismic and electromagnetic controlled-source interferometry in dissipative media," Geophysical Prospecting, 2008, 56, pp. 419-434.

* cited by examiner $$\mathbf{P} = \begin{bmatrix} p(\bar{x}_{R1}, \bar{x}_{S1}, t) & \cdots & p(\bar{x}_{R1}, \bar{x}_{Si}, t) & \cdots & p(\bar{x}_{R1}, \bar{x}_{SM}, t) \\ \vdots & & \vdots & & \vdots \\ p(\bar{x}_{RM}, \bar{x}_{S1}, t) & \cdots & p(\bar{x}_{RM}, \bar{x}_{Si}, t) & \cdots & p(\bar{x}_{RM}, \bar{x}_{SM}, t) \end{bmatrix} \longrightarrow \tilde{\mathbf{P}} = \begin{bmatrix} \tilde{P}(\bar{k}_R, z'|x_{S1}, \omega) & \cdots & \tilde{P}(\bar{k}_R, z'|x_{Si}, \omega) & \cdots & \tilde{P}(\bar{k}_R, z'|x_{SM}, \omega) \end{bmatrix}$$

602 → 702

FIG. 7A $$\mathbf{V}_z = \begin{bmatrix} v_z(\bar{x}_{R1}, \bar{x}_{S1}, t) & \cdots & v_z(\bar{x}_{R1}, \bar{x}_{Si}, t) & \cdots & v_z(\bar{x}_{R1}, \bar{x}_{SM}, t) \\ \vdots & & \vdots & & \vdots \\ v_z(\bar{x}_{RM}, \bar{x}_{S1}, t) & \cdots & v_z(\bar{x}_{RM}, \bar{x}_{Si}, t) & \cdots & v_z(\bar{x}_{RM}, \bar{x}_{SM}, t) \end{bmatrix} \longrightarrow \tilde{\mathbf{V}}_z = \begin{bmatrix} \tilde{V}_z(\bar{k}_R, z'|x_{S1}, \omega) & \cdots & \tilde{V}_z(\bar{k}_R, z'|x_{Si}, \omega) & \cdots & \tilde{V}_z(\bar{k}_R, z'|x_{SM}, \omega) \end{bmatrix}$$

604 → 704

FIG. 7B $$\tilde{\mathbf{P}} = \left[ \tilde{P}(\bar{k}_R, z' | x_{S1}, \omega) \cdots \tilde{P}(\bar{k}_R, z' | x_{Si}, \omega) \cdots \tilde{P}(\bar{k}_R, z' | x_{SM}, \omega) \right]$$

$$\tilde{\mathbf{P}}^- = \left[ \tilde{P}^-(\bar{k}_R, z' | x_{S1}, \omega) \cdots \tilde{P}^-(\bar{k}_R, z' | x_{Si}, \omega) \cdots \tilde{P}^-(\bar{k}_R, z' | x_{SM}, \omega) \right]$$

$$\tilde{\mathbf{V}}_{\pm} = \left[ \tilde{V}_{\pm}(\bar{k}_R, z' | x_{S1}, \omega) \cdots \tilde{V}_{\pm}(\bar{k}_R, z' | x_{Si}, \omega) \cdots \tilde{V}_{\pm}(\bar{k}_R, z' | x_{SM}, \omega) \right]$$

$$\mathbf{P}^- = \left\{ \begin{array}{ccccc} P^-(\bar{x}_{R1}, \bar{x}_{S1}, \omega) & \cdots & P^-(\bar{x}_{R1}, \bar{x}_{Si}, \omega) & \cdots & P^-(\bar{x}_{R1}, \bar{x}_{SM}, \omega) \\ \vdots & \ddots & \vdots & & \vdots \\ P^-(\bar{x}_{Ri}, \bar{x}_{S1}, \omega) & \cdots & P^-(\bar{x}_{Ri}, \bar{x}_{Si}, \omega) & \cdots & \vdots \\ \vdots & & \vdots & \ddots & \vdots \\ P^-(\bar{x}_{RM}, \bar{x}_{S1}, \omega) & \cdots & P^-(\bar{x}_{RM}, \bar{x}_{Si}, \omega) & \cdots & P^-(\bar{x}_{RM}, \bar{x}_{SM}, \omega) \end{array} \right\}$$

FIG. 8A

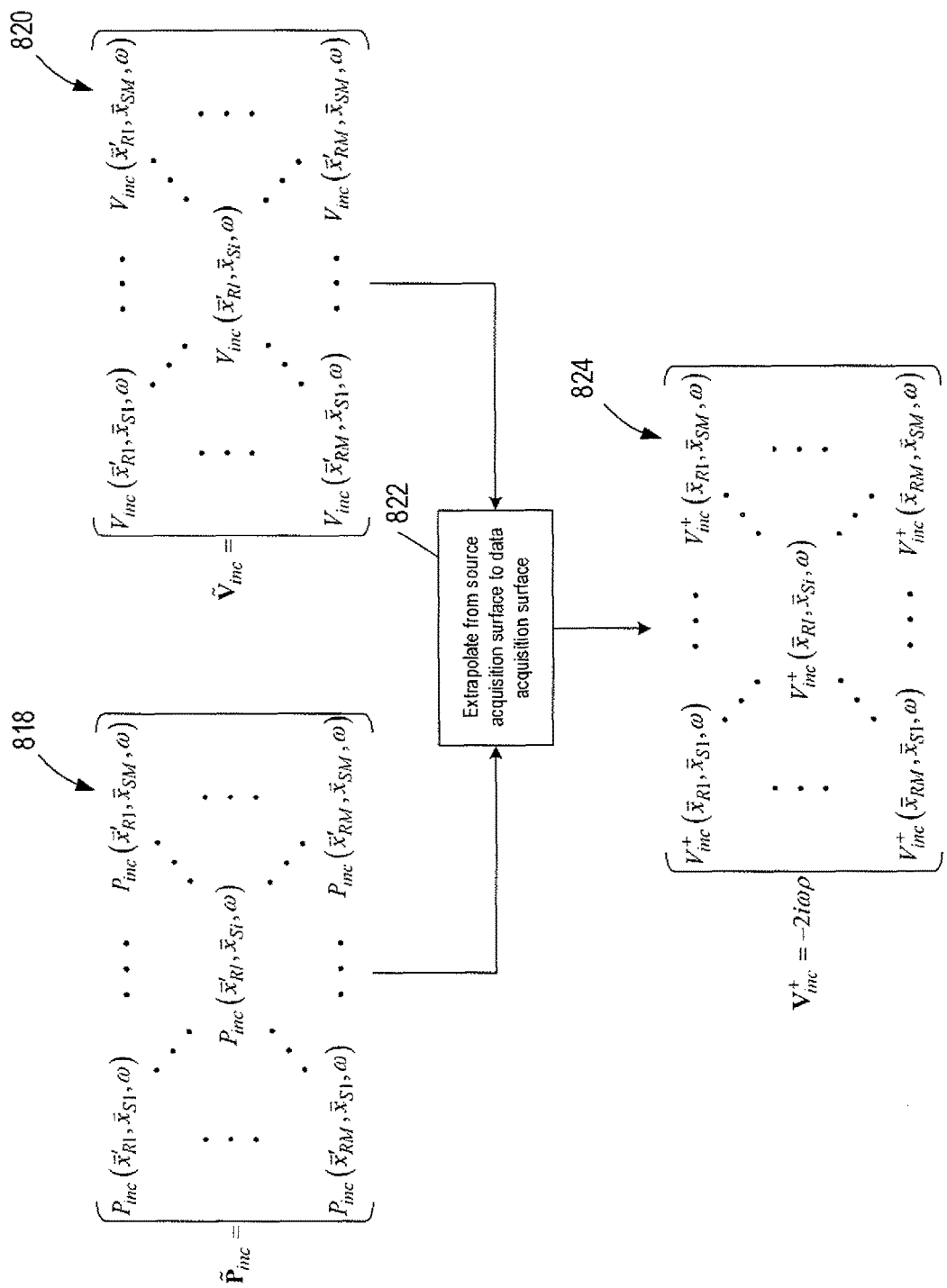

$$\begin{Bmatrix} P^-(x_{R1},\bar{x}_{S1},\omega) & \cdots & P^-(x_{R1},\bar{x}_{SM},\omega) \\ \vdots & P^-(x_{R1},\bar{x}_{Si},\omega) & \vdots \\ P^-(x_{RM},\bar{x}_{S1},\omega) & \cdots & P^-(x_{RM},\bar{x}_{SM},\omega) \end{Bmatrix}_{816}$$

$$\mathbf{P}^-$$

$$=$$

$$\begin{Bmatrix} P^{-+}(x_{R1},\bar{x}_{S1},\omega) & \cdots & P^{-+}(x_{R1},\bar{x}_{SM},\omega) \\ \vdots & P^{-+}(x_{R1},\bar{x}_{Si},\omega) & \vdots \\ P^{-+}(x_{RM},\bar{x}_{S1},\omega) & \cdots & P^{-+}(x_{RM},\bar{x}_{SM},\omega) \end{Bmatrix}_{902}$$

$$\mathbf{P}^{-+}$$

$$\times(-2i\omega\rho)$$

$$\begin{Bmatrix} V_{inc}(\bar{x}_{R1},\bar{x}_{S1},\omega) & \cdots & V_{inc}(\bar{x}_{R1},\bar{x}_{SM},\omega) \\ \vdots & V_{inc}(\bar{x}_{R1},\bar{x}_{Si},\omega) & \vdots \\ V_{inc}(\bar{x}_{RM},\bar{x}_{S1},\omega) & \cdots & V_{inc}(\bar{x}_{RM},\bar{x}_{SM},\omega) \end{Bmatrix}_{820}$$

$$\mathbf{V}_{inc}^+$$

FIG. 9

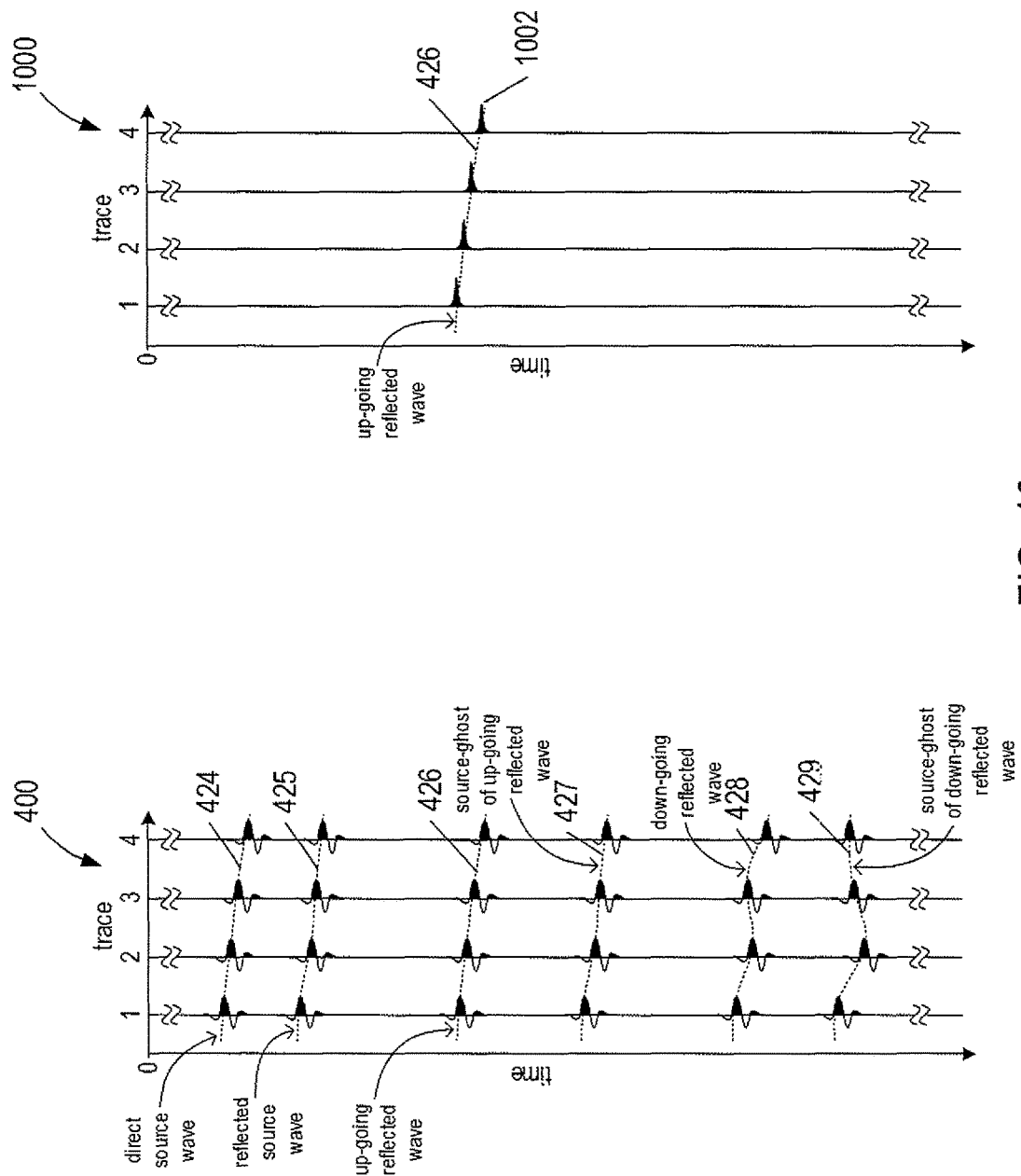

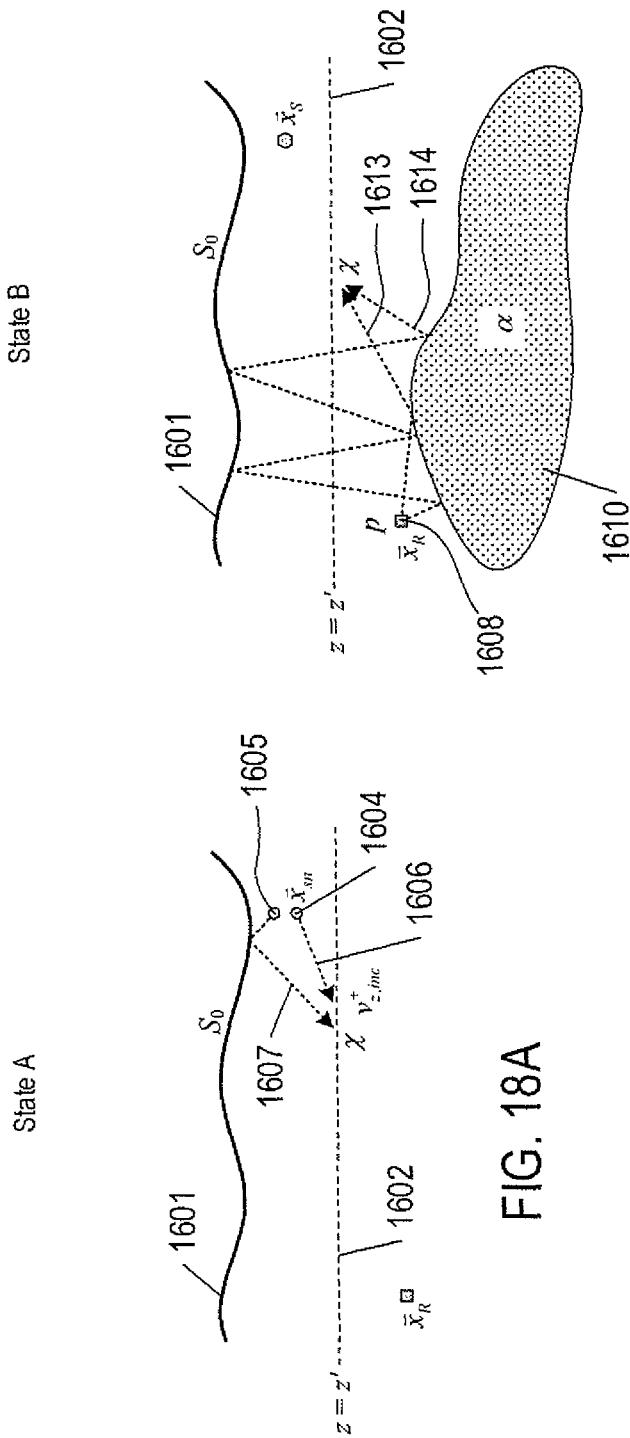

METHODS AND SYSTEMS TO SOURCE DEGHOST AND SOURCE DESIGNATURE MARINE SEISMIC DATA

CROSS-REFERENCE TO A RELATED APPLICATION

This application claims the benefit of Provisional Application 62/150,366, filed Apr. 21, 2015.

BACKGROUND

Marine seismology companies invest heavily in the development of marine seismic surveying equipment and seismic data processing techniques in order to obtain accurate, high-resolution seismic images of subterranean formations located beneath a body of water. High-resolution seismic images of a subterranean formation are used to determine the structure of subterranean formations, discover petroleum reservoirs, and monitor petroleum reservoirs during production. A typical marine seismic survey is carried out with a survey vessel that tows one or two seismic sources and a number of streamers below the surface of the body of water. A seismic source is composed of an array of source elements, such as air guns. The streamers are elongated cable-like structures that are towed behind the survey vessel in the direction the survey vessel is traveling. Each streamer includes a number of receivers that generate seismic data in response to detecting pressure and/or particle motion wavefields. The streamers are arranged substantially parallel to one another to form a seismic data acquisition surface. The survey vessel contains seismic acquisition equipment, such as navigation control, seismic source control, seismic receiver control, and seismic data recording equipment.

A typical marine seismic survey is carried out by activating the seismic source above a subterranean formation, which produces an acoustic signal called a source wavefield of defined shape (or source signature) that expands outward in all directions. A portion of the source wavefield travels downward through the body of water and into the subterranean formation. At each interface between different types of rock and sediment, a portion of the source wavefield is refracted, a portion is transmitted, and another portion is reflected back from each interface into the body of water to propagate toward the free surface. The seismic data generated by the receivers ideally represents just the wavefields that are reflected back into the body of water from the subterranean formation and travel directly to the receivers. However, because the source wavefield expands outward in all directions, the receivers also detect other wavefields. For example, a portion of the source wavefield travels directly from the source to the receivers, and another portion of the source wavefield travels upward to the free surface and is reflected downward creating a second time-delayed downward traveling source wavefield that interacts with the subterranean formation to produce secondary reflected wavefields from the subterranean formation. As a result, the seismic data is contaminated with the source signature and source ghost effects.

DESCRIPTION OF THE DRAWINGS

FIG. 7A shows pressure data transformed from a space-time domain to a wavenumber-frequency domain.

FIG. 7B shows vertical velocity data transformed from a space-time domain to a wavenumber-frequency domain.

FIG. 8A shows calculation of up-going pressure wavefield.

FIGS. 8B-8C show calculation of direct incident down-going velocity wavefield.

FIG. 9 shows a source deghosted and designatured up-going pressure wavefield that relates an up-going pressure wavefield to a direct incident down-going velocity wavefield.

FIG. 10 shows source deghosted and designatured traces of seismic data.

FIGS. 18A-18B show a direct incident down-going vertical velocity wavefield of State A and designatured and source deghosted up-going pressure wavefield of State B.

DETAILED DESCRIPTION

Methods and systems that substantially remove source signature and source ghost effects from marine seismic data independent of the conditions of the free surface are described. In particular, methods and systems described below may be used to substantially remove source signature and source ghost effects from marine seismic data generated by marine surveys carried out under rough weather conditions.

Figure 1A:
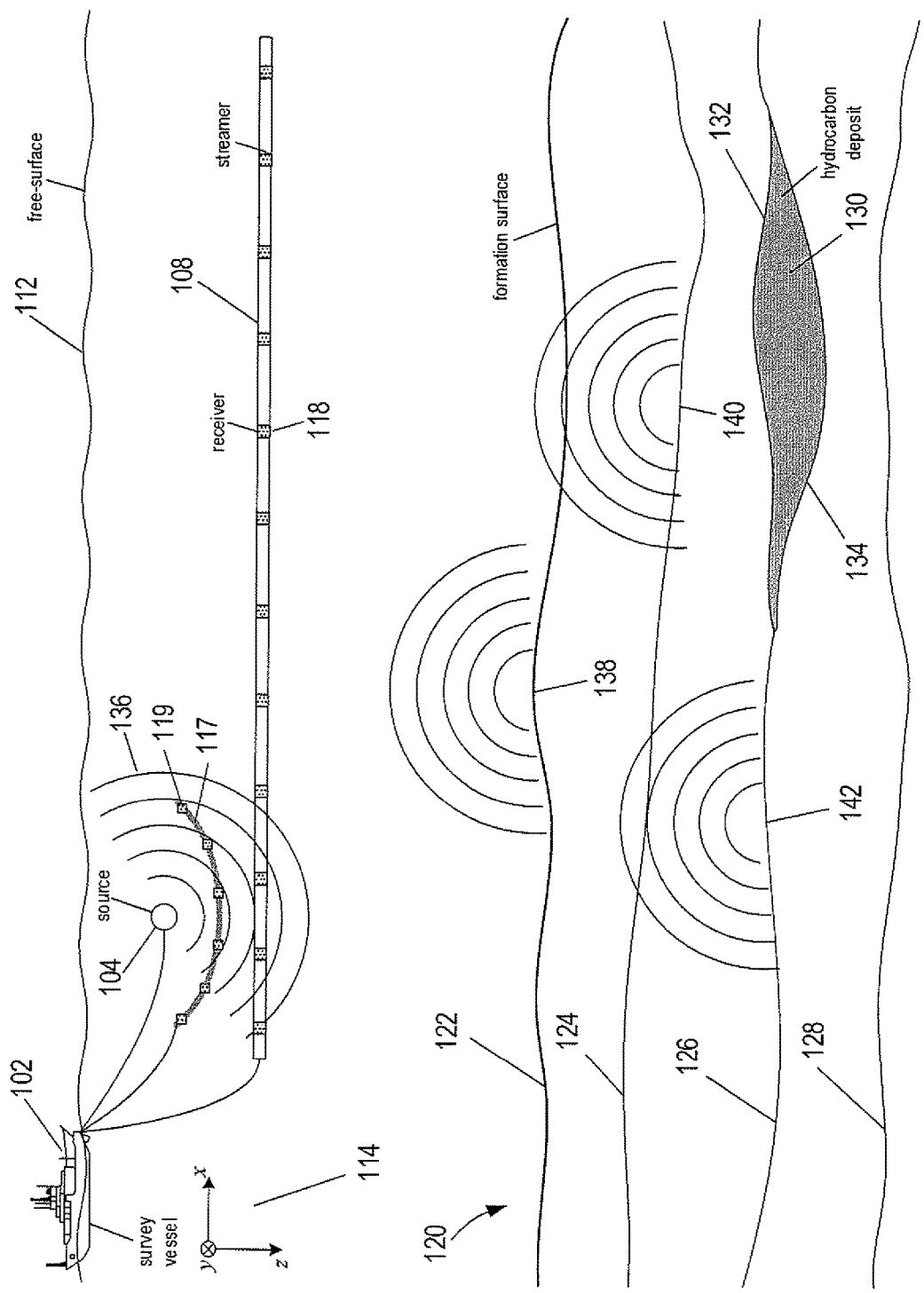
FIGS. 1A-1B show side-elevation and top views of an example seismic data acquisition system.
Figure 1B:
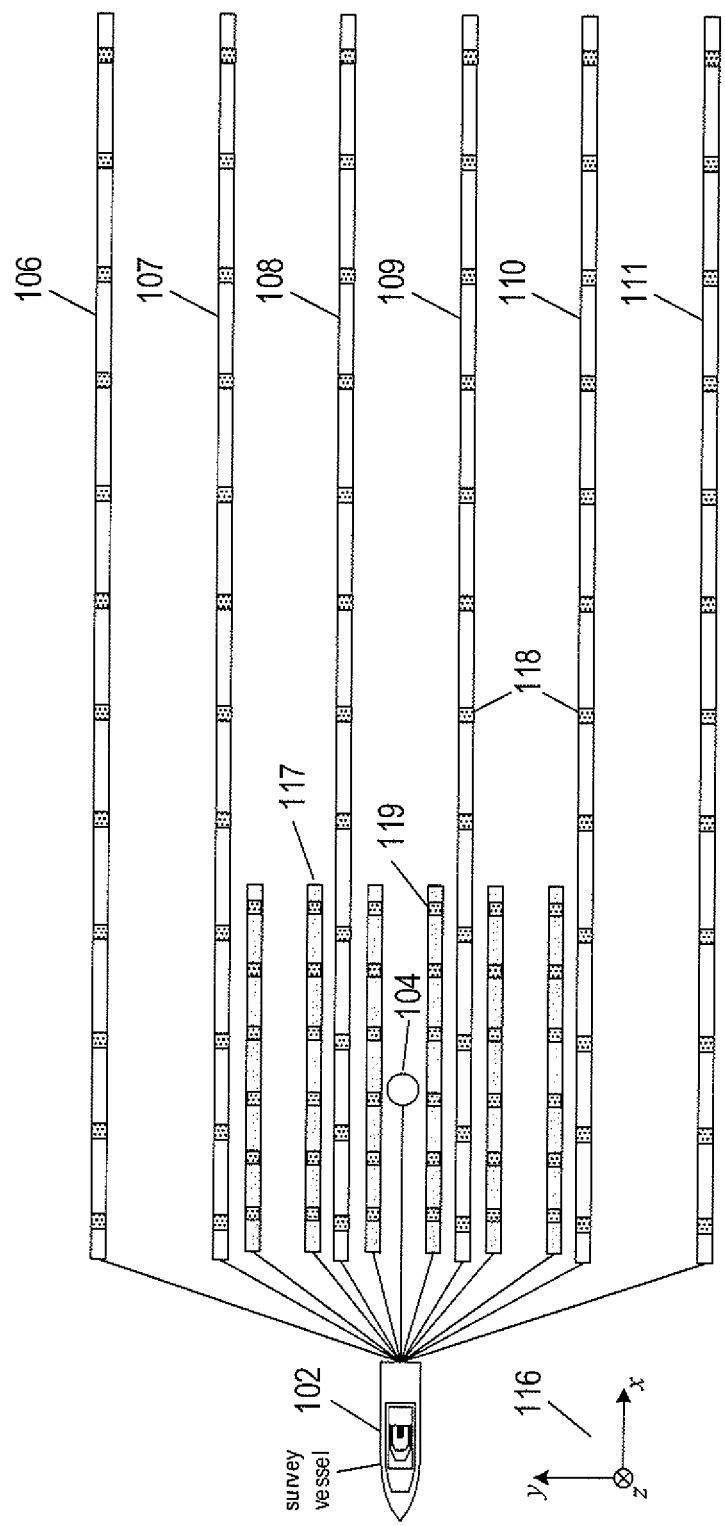

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal seismic data acquisition surface with respect to the free surface 112. Although the streamers 106-111 illustrated in FIGS. 1A and 1B and in subsequent figures as straight and substantially parallel to the free surface 112, in practice, the shape of the streamers may vary as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. The source 104 is composed of an array of N source elements. The source elements may be air guns or water guns. In FIG. 1A, the survey vessel 102 also tows a second set of streamers, such as streamer 117, between the source 104 and the streamers 106-111. The second set of streamers form a source acquisition surface. As shown in FIG. 1A, the streamers 117 may be curved to form a hemispherical-shaped or curved source acquisition surface below the source 104 and with the source 104 near the center of the hemispherical shape. The curved shape of the source acquisition surface enables the particle motion sensors to measure the radially expanding source wavefield normal to wavefront of the source wavefield.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the location of a point in a direction parallel to the length of the streamers or in the direction the survey vessel is traveling and is referred to as the "in-line" direction. The y-direction specifies the location of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables that contain power and data-transmission lines that connect receivers represented by shaded rectangles, such as receiver 118, spaced-apart along the length of each streamer to seismic acquisition equipment and data-storage devices located on board the survey vessel 102. The streamers 117 of the source acquisition surface are cables that contain power and data-transmission lines that connect receivers, such as receiver 119, spaced-apart along the length of each streamer to the seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with, depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the three or more sources comprising the source 104 may be activated to produce blended acoustic signals at spatial and/or temporal intervals. Activation of each source of the source 104 is often called a "shot." In other implementations, the source 104 may be towed by one survey vessel and the streamers may be towed by a different survey vessel. FIG. 1A shows an acoustic signal expanding outward from the source 104 as a source wavefield 136 represented by semicircles of increasing radius centered at the source 104. The outwardly expanding wavefronts of the source wavefield 136 may be spherical but are shown in vertical plane cross section in FIG. 1A. A portion of the source wavefield 136 eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the source wavefield 136 is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118. As shown in FIG. 1A, waves of significant amplitude may be generally reflected from points on or close to the formation surface 122, such as point 138, and from points on or very close to interfaces within the subterranean formation 120, such as points 140 and 142. The upward expanding waves reflected from the formation surface 122 and interfaces 124, 126, and 128 within the subterranean formation 120 are collectively the "reflected wavefield."

The waves that compose the reflected wavefield may be generally reflected at different times within a range of times following the initial source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source 104.

Acoustic and elastic waves, however, may travel at different velocities within different materials as well as within the same material under different pressures. Therefore, the travel times of the source wavefield 136 and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield 136 may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Each receiver 118 of the data acquisition surface may be a multi-component sensor including particle motion sensors and a pressure sensor. A pressure sensor detects variations in water pressure over time. The term "particle motion sensor" refers to a sensor that may detect particle displacement, particle velocity, or particle acceleration over time. Each receiver 119 of the source acquisition surface is a multi-component sensor with sensitivity tuned to detect the source wavefield. Each receiver 119 may include a pressure sensor and a particle motion sensor.

Figure 2:
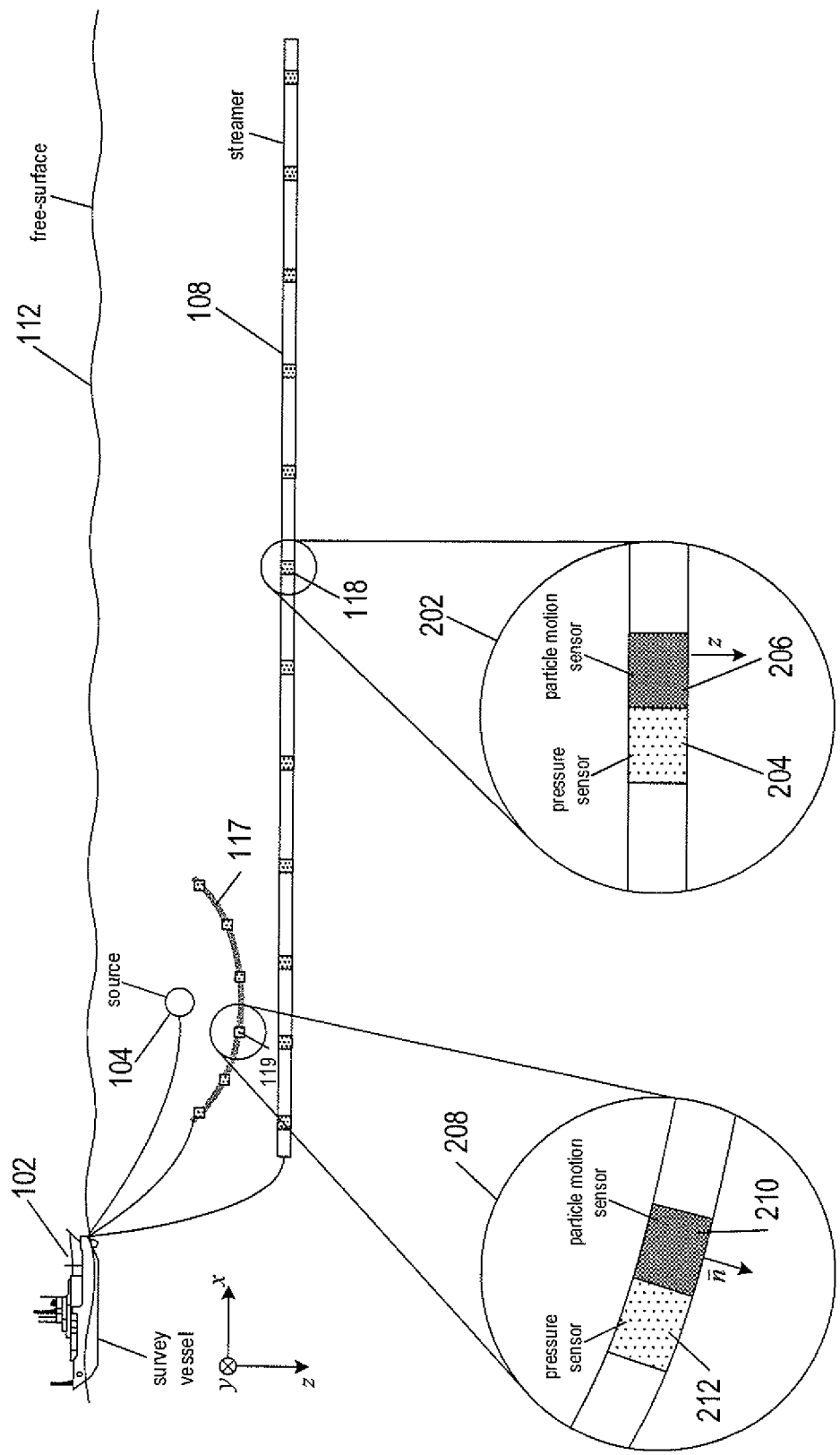
FIG. 2 shows a side-elevation view of a seismic data acquisition system with a magnified view of a receiver.

FIG. 2 shows a side-elevation view of the marine seismic data acquisition system with a magnified view 202 of the receiver 118. In this example, the magnified view 202 reveals that the receiver 118 is a multi-component sensor composed of a pressure sensor 204 and a particle motion sensor 206. The pressure sensor 204 may be, for example, a hydrophone. Each pressure sensor is a non-directional sensor that measures changes in hydrostatic pressure over time to produce pressure data denoted by $p(\vec{x}_R,t)$, where $\vec{x}_R$ represents the Cartesian coordinates $(x_R,y_R,z_R)$ of a receiver, superscript R is a receiver index, and t represents time. The particle motion sensors may be responsive to water motion. In general, particle motion sensors detect particle motion (i.e., displacement, velocity, or acceleration) in a particular direction and may be responsive to such directional displacement of the particles, velocity of the particles, or acceleration of the particles. A particle motion sensor that measures particle displacement generates particle displacement data denoted by $g_{\vec{n}}(\vec{x}_R,t)$, where the vector $\vec{n}$ represents the direction along which particle displacement is measured. A particle motion sensor that measures particle velocity (i.e., particle velocity sensor) generates particle velocity data denoted by $v_{\vec{n}}(\vec{x}_R,t)$. A particle motion sensor that measures particle acceleration (i.e., accelerometer) generates particle acceleration data denoted by $a_{\vec{n}}(\vec{x}_R,t)$. The data generated by one type of particle motion sensor may be converted to another type. For example, particle displacement data may be differentiated to obtain particle velocity data, and particle acceleration data may be integrated to obtain particle velocity data. FIG. 2 also includes a magnified view 208 of the receiver 119 implemented with a particle motion sensor 210 and a pressure sensor 212. The particle motion sensors generate particle displacement data $g_{\vec{n}}(\vec{x}'_R,t)$, particle velocity data $v_{\vec{n}}(\vec{x}'_R,t)$, or particle acceleration data $a_{\vec{n}}(\vec{x}'_R,t)$, where the Cartesian coordinates $(x'_R,y'_R,z'_R)$ are receiver coordinates of the source acquisition surface.

The term "particle motion data" is a general term used to refer to particle displacement data, particle velocity data, or particle acceleration data, and the term "seismic data" is used to refer to pressure data and/or particle motion data. The pressure data represents a pressure wavefield, particle displacement data represents a particle displacement wavefield, particle velocity data represents a particle velocity wavefield, and particle acceleration data represents a particle acceleration wavefield. The particle displacement, velocity, and acceleration wavefields are referred to as particle motion wavefields.

The particle motion sensors of the data acquisition surface are typically oriented so that the particle motion is measured in the vertical direction (i.e., $\vec{n}=(0,0,z)$) in which case $g_z(\vec{x}_R,t)$ is called vertical displacement data, $v_z(\vec{x}_R,t)$ is called vertical velocity data, and $a_z(\vec{x}_R,t)$ is called vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n}\cdot\vec{n}_1=\vec{n}\cdot\vec{n}_2=0$, where "·" is the scalar product) and orthogonal to one another (i.e., $\vec{n}_1\cdot\vec{n}_2=0$). In other words, each receiver may include three particle motion sensors that measure particle motion in three orthogonal directions.

The curved hemispherical shaped of the source acquisition surface orients the particle motion sensors so that the source wavefield is measured in the direction of radial expansion. In other words, hemispherical shape of the source acquisition surface orients each particle motion sensor so that the direction along which particle displacement is measured, $\vec{n}$, points substantially in the same direction as the radially expanding source wavefield that reaches the particle motion sensor, as shown in magnified view 208 of FIG. 2. For example, $v_{\vec{n}}(\vec{x}'_R,t)$ is the particle velocity data measured in the direction of radial expansion of the source wavefield, where $\vec{n}$ points substantially perpendicular to the spherical wavefront of the source wavefield. As a result, the source wavefield is effectively directly incident on the detectors of the particle motion sensors. The particle velocity measured by a particle motion sensor of the source acquisition surface is denoted by $v_{inc}(\vec{x}'_R,t)$ and is called the direct incident velocity data. Alternatively, each receiver 119 may have two or more pressure sensors at different radial positions of the source acquisitions surface that may be used to calculate $v_{inc}(\vec{x}'_R,t)$ as described below. The pressure sensor 212 generates pressure data $p_{inc}(\vec{x}'_R,t)$.

The streamers 106-111 and the survey vessel 102 may include sensing electronics and data-processing facilities that allow seismic data generated by each receiver to be correlated with the time each source of the source 104 is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102 and/or transmitted to an onshore seismic data-processing facility.

Each pressure sensor and particle motion sensor may include an analog-to-digital converter that converts time-dependent analog signals into discrete time series that consist of a number of consecutively measured values called "amplitudes" separated in time by a sample rate. The time series data generated by a pressure or particle motion sensor is called a "trace," which may consist of thousands of samples collected at a typical sample rate of about 1 to 5 ms. A trace records variations in a time-dependent amplitude that corresponds to fluctuations in acoustic energy of a wavefield measured by the sensor. In general, each trace is an ordered set of discrete spatial and time-dependent pressure or motion sensor amplitudes denoted by:

$$tr(\vec{x}_R, \vec{x}_S, t) = \{A(\vec{x}_R, \vec{x}_S, t_j)\}_{j=0}^{J-1} \quad (1)$$

where tr represents pressure, particle displacement, particle velocity, or particle acceleration amplitude;

$\vec{x}_S = (x_S, y_S, z_S)$ is the center of the source elements of the source 104;

A represents amplitude;

$t_j$ is the jth sample time; and

J is the number of time samples in the trace.

The coordinate location of each receiver, $\vec{x}_R$ and $\vec{x}'_R$, may be calculated from global position information obtained from one or more global positioning devices located along the streamers of the source wavefield and data acquisition surfaces, survey vessel, and buoys and the known geometry and arrangement of the streamers and receivers. The coordinate location $\vec{x}_S$ may also be obtained from one or more global positioning devices located at the source 104 and the known geometry and arrangement of the source elements that form the source 104. Each trace also includes a trace header not represented in Equation (1) that identifies the specific receiver that generated the trace, receiver and source GPS spatial coordinates, and may include time sample rate and the number of time samples.

Figure 3:
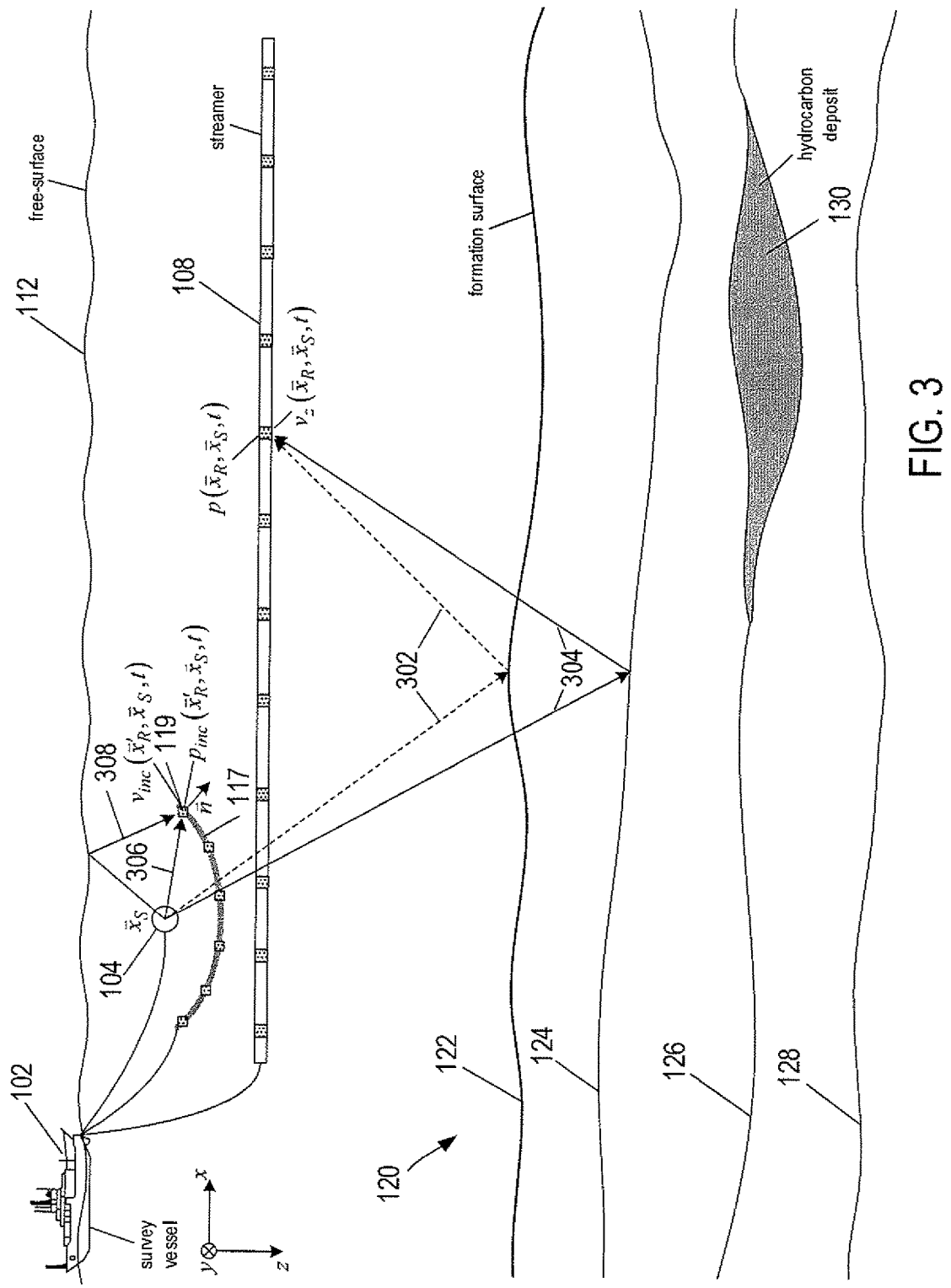
FIG. 3 shows example ray paths of an acoustic signal output from a source.

As explained above, the reflected wavefield typically arrives first at the receivers located closest to the sources. The distance from the sources to a receiver is called the "source-receiver offset," or simply "offset." A larger offset generally results in a longer arrival time delay. FIG. 3 shows example ray paths of an acoustic signal generated by the source 104. Dashed-line ray 302 represent acoustic energy reflected from the formation surface 122 to the receivers 118, and solid-line rays 304 represent acoustic energy reflected from the interface 124 to the receivers 118. Dashed line ray 306 represents acoustic energy that travels directly from the source 104 to the receiver 119, and dashed line ray 308 represents acoustic energy that is reflected from free surface 112 before reaching the receiver 119. For simplicity of illustration only a small number of ray paths are represented. In the example of FIG. 3, the particle motion sensors located at each receiver 119 generate normal velocity data of the direct and reflected portions of the source wavefield denoted by $v_{inc}(\vec{x}'_R, \vec{x}_S, t)$ and is called the "direct incident velocity data," and pressure sensors generate direct incident pressure data $p_{inc}(\vec{x}'_R, \vec{x}_S, t)$. Pressure and particle motion sensors at each receiver 118 generate pressure data $p(\vec{x}_R, \vec{x}_S, t)$ and vertical velocity data $v_z(\vec{x}_R, \vec{x}_S, t)$ of the reflected wavefield emanating from the subterranean formation 120 in response to the acoustic signal. The pressure data and vertical velocity data generated at each of the receivers 118 and 119 may be time sampled and recorded as separate traces.

Ideally, the acoustic energy of an acoustic signal output from the source 104 travels directly from the source 104 to the subterranean formation 120 and is reflected back to the receivers 118 as shown in FIG. 3. In practice, however, the acoustic energy spreads out radially from the source 104, as described above with reference to FIG. 1A, and because the free surface of a body of water reflects acoustic energy, "ghost" effects created by free-surface reflections contaminate seismic data generated by the receivers 118. The ghost effects result from portions of the acoustic energy being reflected from the free surface 112 before reaching the receivers 118 and from acoustic energy that travels upward from the subterranean formation 120 and is reflected from the free surface 112 before reaching the receivers 118. As a result, the receivers 118 measure not only portions of the reflected wavefields that travel directly from the subterranean formation 120 to the receivers 118 but also measure time-delayed (i.e., ghost) wavefields created by reflections from the free surface 112. The two types of ghosts that are typically recorded in the seismic data are a source ghost and a receiver ghost. The receivers 118 also measure direct and reflected portions of the source wavefield.

Figure 4:
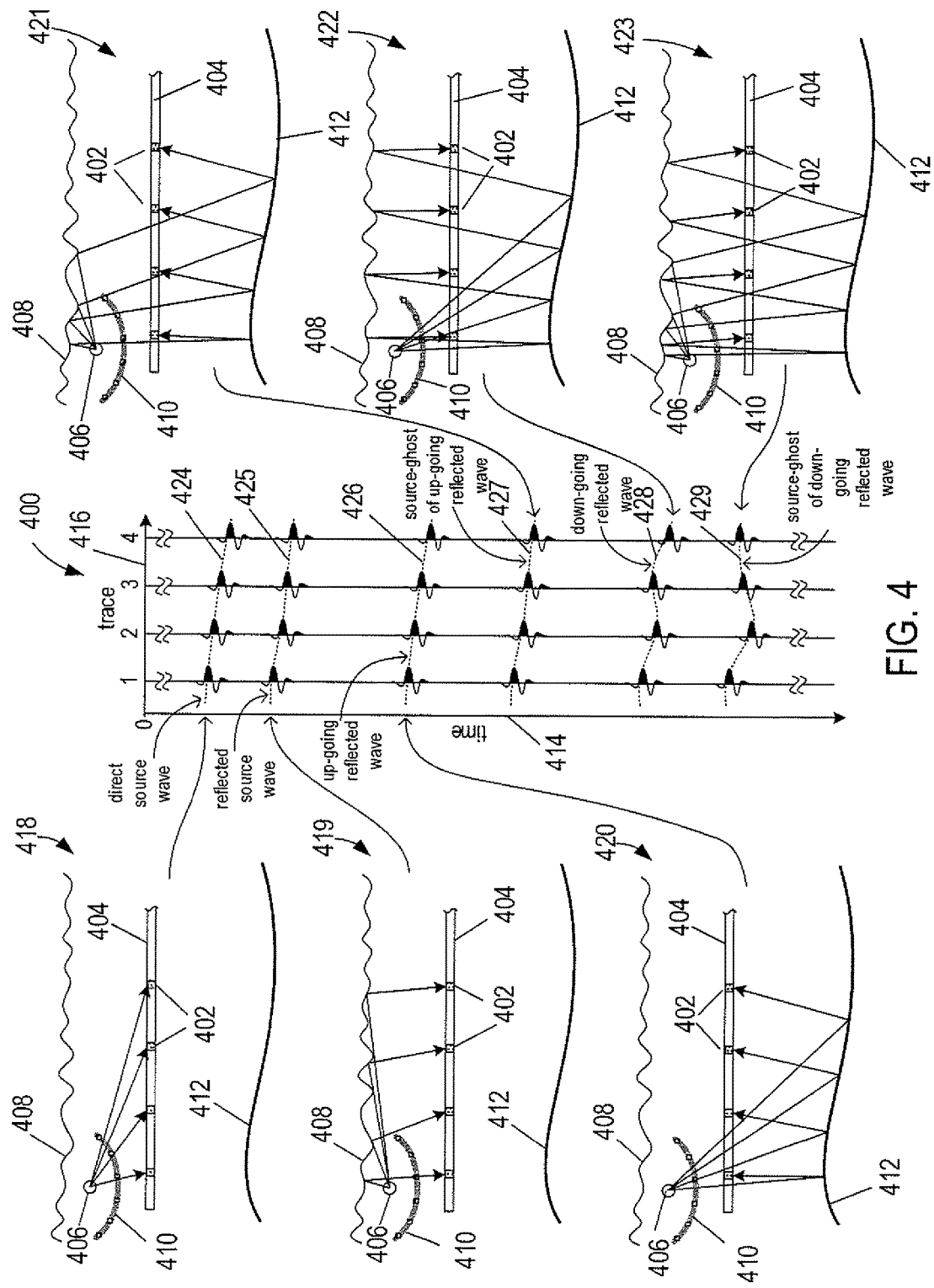
FIG. 4 shows a plot of four example traces that record different wavefields.

FIG. 4 shows a plot of four example traces 400 of a gather that record different wavefield events within a time window. The four example traces are generated by four receivers 402 of a streamer 404 of a data acquisition surface located below a source 406 and a free surface 408. A streamer 410 of a source acquisition surface is located at a depth between the depth of the source 406 and the depth of the streamer 404. Curve 412 represents a surface of a subterranean formation. Axis 414 represents time, and axis 416 represents trace numbers (i.e., channels) with trace "1" representing the seismic data generated by the receiver 402 located closest to the source 406 and trace "4" representing the seismic data generated by the receiver 402 located farther away from the source 406. FIG. 4 includes events 418-423 that represent six different ways in which acoustic energy output from the source 406 reaches the receivers 402 and is recorded in the seismic data generated by the receives 402. Event 418 represents a portion of the acoustic energy that travels directly from the source 406 to the receivers 402 and is recorded as wavelets located along curve 424 and is called a direct source wave. Event 419 represents a portion of the acoustic energy that travels from the source 406 to the free surface 408 then to the receivers 402 and is recorded as wavelets located along a curve 425 and is called the reflected source wavefield. The wavelets located along curve 426 represent a direct "up-going" reflected wave as represented in event 420. The wavelets located along the curve 427 represent the "source-ghost" of the direct up-going reflected wave as represented in event 421. The wavelets located along the curve 428 represent a "down-going" reflected wave as represented in event 422, which may also be called a "receiver-ghost" reflected wave. The wavelets located along the curve 429 represent the "source-ghost" of the down-going reflected wave as represented in event 419. Ideally, the up-going reflected waves represent by the event 420 are used to generate seismic images that reveal structural information about the subterranean formation. The direct source wave, reflected source wave, receiver ghosts, and source ghosts represented by the events 418, 419, and 421-423 are considered noise that contaminates the pressure and vertical velocity data and contaminates seismic images.

Figure 5A:
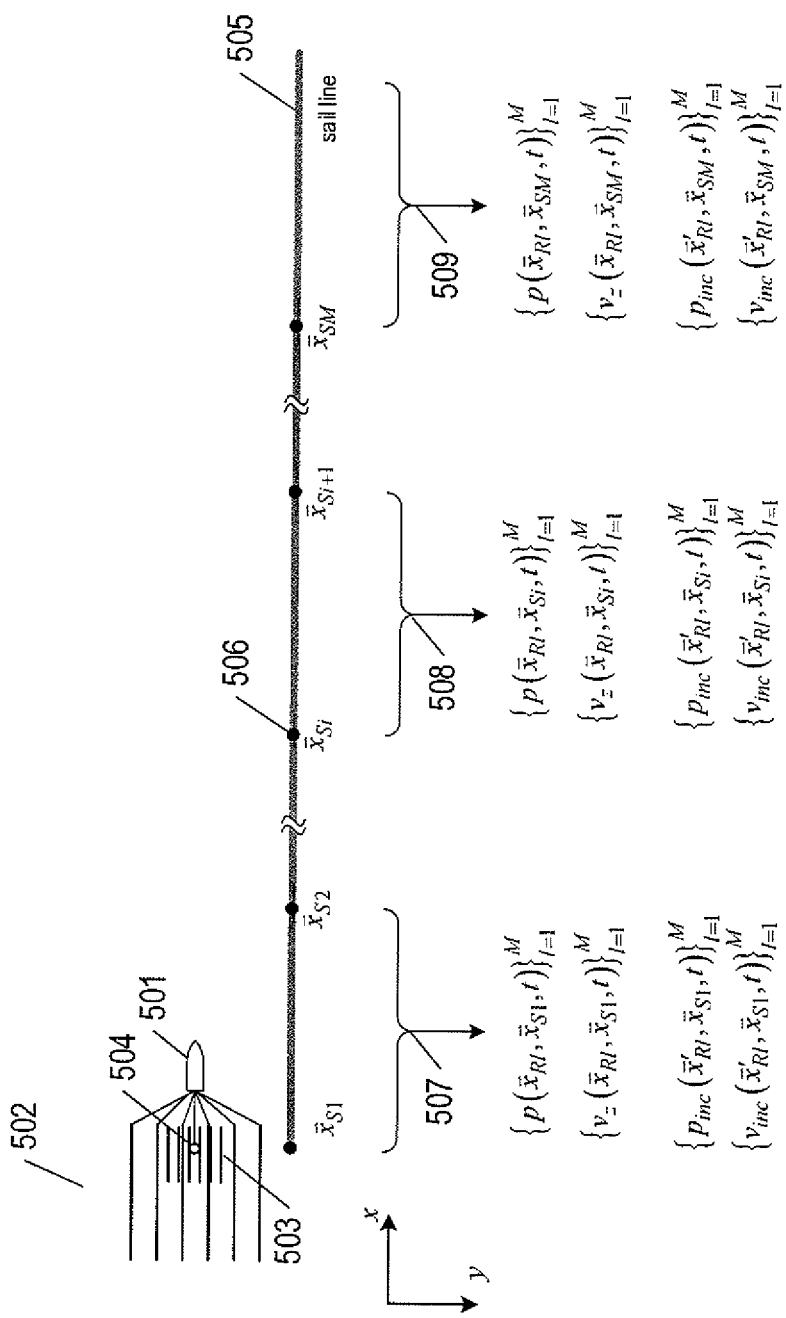
FIG. 5A shows an example of recording seismic data in M separate shot records as a survey vessel travels a sail line of a marine seismic survey.

Methods to calculate a source deghosted and source designatured up-going pressure wavefield are now described. FIG. 5A shows an example of recording seismic data in M separate shot records as a survey vessel travels a sail line of a marine seismic survey. In the example of FIG. 5A, a survey vessel 501 tows six streamers 502 of a data acquisition surface, six streamers 503 of source acquisition surface, and a source 504 along a sail line 505. As the survey vessel 501 travels the sail line 505 at a substantially constant rate of speed, the source 504 is activated at the M source-activation locations $\vec{x}_{Si}$ identified by circles, such as circle 506, where the subscript i=1, . . . , M, (i.e., location of the center of the array of source elements that from the source). After each activation of the source 504, a set of pressure data and a set of vertical velocity data is recorded in time intervals that correspond to the spatial intervals 507-509. A set of pressure data recorded in the ith spatial interval is given by $$\{p(\vec{x}_{Rl},\vec{x}_{Si},t)\}_{l=1}^{M} \quad (2)$$

where $p(\vec{x}_{Rl},\vec{x}_{Si},t)$ is the pressure data generated by a pressure sensor located at the lth receiver location $\vec{x}_{Rl}$ for the source 503 activated at the ith source location $\vec{x}_{Si}$.

A set of vertical velocity data recorded in the ith spatial interval is given by $$\{v_z(\vec{x}_{Rl},\vec{x}_{Si},t)\}_{l=1}^{M} \quad (3)$$

where $v_z(\vec{x}_{Rl},\vec{x}_{Si},t)$ is the vertical velocity data generated by a particle motion sensor located at the lth receiver location $\vec{x}_{Rl}$ for the source 503 activated at the ith source location $\vec{x}_{Si}$.

The pressure and particle motion sensors that generated the pressure data $p(\vec{x}_{Rl},\vec{x}_{Si},t)$ and the vertical velocity data $v_z(\vec{x}_{Rl},\vec{x}_{Si},t)$ are collocated at the lth receiver location $\vec{x}_{Rl}$. In FIG. 5A, the sets of pressure data and corresponding sets of vertical velocity data recorded in the spatial intervals 507-509. Each set of pressure data is a pressure data shot record. Each set of vertical velocity data is vertical velocity data shot record.

A set of direct incident velocity data is also recorded in each of the time intervals that correspond to the spatial intervals 507-509 and is given by $$\{v_{inc}(\vec{x}'_{Rl},\vec{x}_{Si},t)\}_{l=1}^{M} \quad (4)$$

where the subscript "inc" indicates that the particle velocity is measured at the acquisition surface.

Note that the particle motions sensors are oriented to measure the normal component (i.e., direct incident) of the particle motion of the source wavefield to the hemispherical curvature of the source acquisition surface. A set of direct incident pressure data is also recorded in the time intervals that correspond to the spatial intervals 507-509 and is given by $$\{p_{inc}(\vec{x}_{Rl},\vec{x}_{Si},t)\}_{l=1}^{M} \quad (5)$$

where the subscript "inc" indicates that the pressure is measured at the acquisition surface and is non-directional.

The sets of pressure data and sets of vertical velocity data may be sorted into one of many different domains, such as a common-shot domain, common-receiver domain, common-receiver-station domain, and common-midpoint domain. A set of traces sorted into a particular domain is called a gather. For example, a set of traces sorted into the common-shot domain is called a common-shot gather and a set of traces sorted into the common-receiver domain is called a common-receiver gather.

Figure 5B:
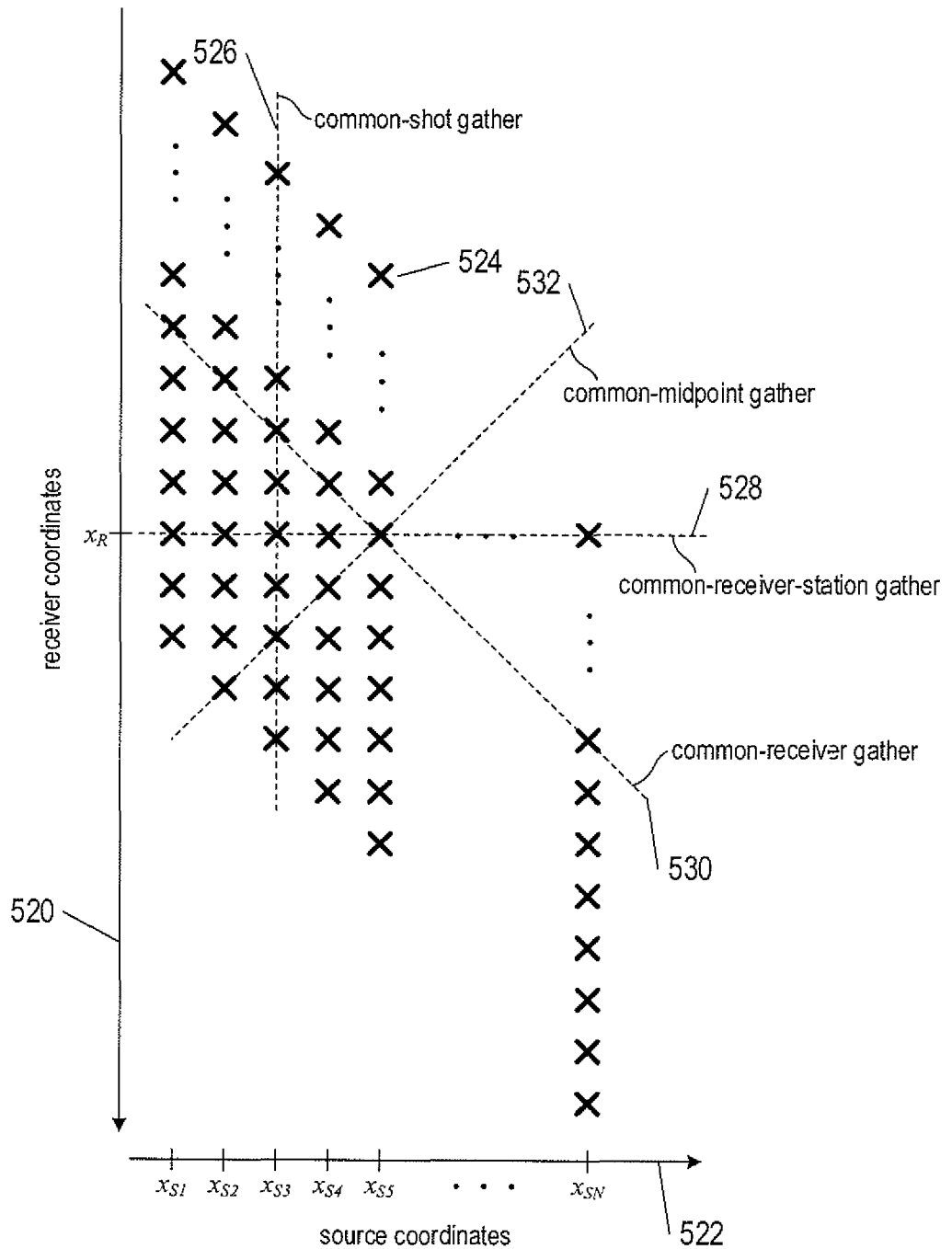
FIG. 5B shows seismic data sorted into different domains.

FIG. 5B shows seismic data 500 sorted into different domains. Vertical axis 520 represents receiver coordinates. Horizontal axis 522 represents source coordinates. Each X, such as X 524, represents a trace of seismic data generated by a receiver at receiver coordinate $\vec{x}_R$ as a result of activating the source at a source coordinate $\vec{x}_S$. A dashed line 526 represents a common-shot gather formed from the seismic data generated by the receivers and one of the sources of the multiple source array activated at a source location. A dashed line 528 represents a common-receiver-station gather formed from the seismic data generated by receivers that pass over the same receiver-coordinate location for the sources of the multiple source array activated at the M different source locations. Diagonal dashed line 530 represents a common-receiver gather of seismic data. Seismic data generated by receivers at the receiver locations and source location along a diagonal represented by dashed line 532 form a common-midpoint ("CMP") gather. The CMP is the point on the formation surface halfway between the location of the source and the location of the receiver. The CMP is not to be confused with common depth points that are located below the CMP at interfaces within the subterranean formation.

Figure 6A:
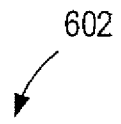
FIG. 6A shows a pressure data formed from sets of pressure data
Figure 6B:
FIG. 6B shows a vertical velocity data formed from sets of vertical velocity data.

The sets of pressure data and sets of vertical velocity data recorded for each activation of the source are organized into corresponding pressure and vertical velocity matrices that represents the pressure and vertical velocity wavefields in the space-time ("s-t") domain. FIG. 6A shows an M×M matrix that represents a pressure wavefield P 602 formed from the sets of pressure data collected in the intervals 507-509 shown in FIG. 5A. The pressure data $p(\vec{x}_{Rl},\vec{x}_{Si},t)$ recorded by a receiver at receiver location $\vec{r}_{Rl}$ for activation of the source at source location $\vec{x}_{Si}$ is an element of the pressure wavefield P 602. FIG. 6B shows an M×M matrix that represents a vertical velocity wavefield $V_z$ 604 formed from the sets of vertical velocity data collected in the intervals 506-509 shown in FIG. 5A. The vertical velocity data $v_z(\vec{x}_{Rl},\vec{x}_{Si},t)$ recorded by a receiver at receiver location $\vec{x}_{Sl}$ for activation of the source at source location $\vec{x}_{Si}$ is an element of the vertical velocity wavefield $V_z$.

Figure 6C:
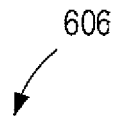
FIG. 6C shows a matrix of direct incident pressure data.
Figure 6D:
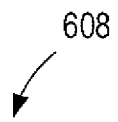
FIG. 6D shows a matrix of direct incident velocity data.

The sets of direct incident pressure data and sets of direct incident velocity data recorded for each activation of the source are organized into corresponding direct incident pressure and velocity matrices that represents the direct incident pressure and velocity wavefields in the space-time ("s-t") domain. FIG. 6C shows an M×M matrix that represents a direct incident pressure wavefield $P_{inc}$ 606 formed from the sets of directed incident pressure data collected in the intervals 507-509 shown in FIG. 5A. The direct incident pressure data $p_{inc}(\vec{x}_{Rl},\vec{x}_{Si},t)$ recorded by a receiver of source acquisition surface is an element of the direct incident pressure wavefield $P_{inc}$ 606. FIG. 6D shows an M×M matrix that represents a direct incident velocity wavefield $V_{inc}$ 608 formed from the sets of direct incident velocity data collected in the intervals 507-509 shown in FIG. 5A. The direct incident velocity data $v_{inc}(\vec{x}_{Rl},\vec{x}_{Si},t)$ recorded by a receiver of source acquisition surface is an element of the direct incident velocity wavefield 606. As shown in FIGS. 6A-6D, the sets of pressure data, vertical velocity data, direct incident pressure data, and direct incident velocity data are organized so that the rows of the matrices 602, 604, 606, and 608 correspond to the M receiver locations and the columns corresponds to the M source locations.

The pressure wavefield P 602 and the vertical velocity wavefield $V_z$ 604 are used to calculate a matrix that represents an up-going pressure wavefield denoted by $P^-$ as follows. The pressure wavefield P 602 and the vertical velocity wavefield $V_z$ 604 are transformed from the s-t domain to the wavenumber-frequency ("w-f") domain. FIG. 7A shows transformation of the pressure wavefield P 602 to a matrix representation of the pressure wavefield $\tilde{P}$ 702 in the w-f domain. For each index l, the pressure wavefield P 602 is transformed from the s-t domain to the w-f domain at a measurement level z=z':

$$p(\vec{x}_{Rl}, \vec{x}_{Si}, t) \rightarrow \tilde{P}(\vec{k}_R, z' | \vec{x}_{Si}, \omega) \qquad (6)$$

where
$\tilde{P}$ represents pressure data in the w-f domain;
$\vec{k}_R = (k_{Rx}, k_{Ry})$ is a horizontal wavenumber vector;
$k_z$ is the vertical wavenumber $$k_z = \sqrt{\frac{c^2}{\omega^2} - k_x^2 - k_y^2};$$

z' is a measurement level described below in the APPENDIX; and
$\omega$ is the angular frequency $\omega=2\pi f$ (f is the frequency).

FIG. 7B shows transformation of the vertical velocity wavefield $V_z$ 604 to a matrix that represents the vertical velocity wavefield $\tilde{V}_z$ 704 in the w-f domain. For each index l, the vertical velocity wavefield $V_z$ is transformed from the s-t domain to a space-frequency ("s-f") domain at the measurement level z=z':

$$v_z(\vec{x}_{Rl}, \vec{x}_{Si}, t) \rightarrow \tilde{V}_z(\vec{k}_R, z' | \vec{x}_{Si}, \omega) \qquad (7)$$

where $\tilde{V}_z$ represents vertical velocity data in the w-f domain.
The transformation may be carried out using a fast Fourier transform ("FFT") or a discrete Fourier transform ("DFT") with respect to time and the z-coordinate (i.e., $z_{Rl}$) of the receiver coordinate location.

The pressure wavefield $\tilde{P}$ 702 and the vertical velocity wavefield $\tilde{V}_z$ 704 in the w-f domain are used to calculate an up-going pressure wavefield represented by a matrix denoted by $\tilde{P}^-$ in the w-f domain, where the superscript "−" denotes up-going. FIG. 8A shows calculation of an up-going pressure wavefield $\tilde{P}^-$ 802 from the pressure wavefield $\tilde{P}$ 702 and the vertical velocity wavefield $\tilde{V}_z$ 704 in the w-f domain. Dashed-line directional arrows 804 and 806 represent calculating up-going pressure data 808 from pressure data 810 and corresponding vertical velocity data 812 as follows:

$$\tilde{P}^-(\vec{k}_R, z' | \vec{x}_{Si}, \omega) = \frac{1}{2}\left[\tilde{P}(\vec{k}_R, z' | \vec{x}_{Si}, \omega) - \frac{\omega\rho}{k_z}\tilde{V}_z(\vec{k}_R, z' | \vec{x}_{Si}, \omega)\right] \qquad (8)$$

where $\rho$ is the speed of sound in water.
The matrix elements of the up-going pressure wavefield $\tilde{P}^-$ 802 in the w-f domain are calculated according to Equation (8) for each of the lth and ith indices. The elements of the up-going pressure wavefield $\tilde{P}^-$ 802 are transformed 814 from the w-f domain to the s-f domain to obtain an up-going pressure wavefield $\tilde{P}^-$ 816 in the s-f domain. For each index l, elements of the up-going pressure wavefield 802 are inverse transformed from the w-f domain to the s-f domain to obtain:

$$\tilde{P}^-(\vec{k}_R, z' | \vec{x}_{Si}, \omega) \rightarrow P^-(\vec{x}_{Rl}, \vec{x}_{Si}, \omega) \qquad (9)$$

for each index l and i in the up-going pressure wavefield $P^-$ 816.

Figure 8B:
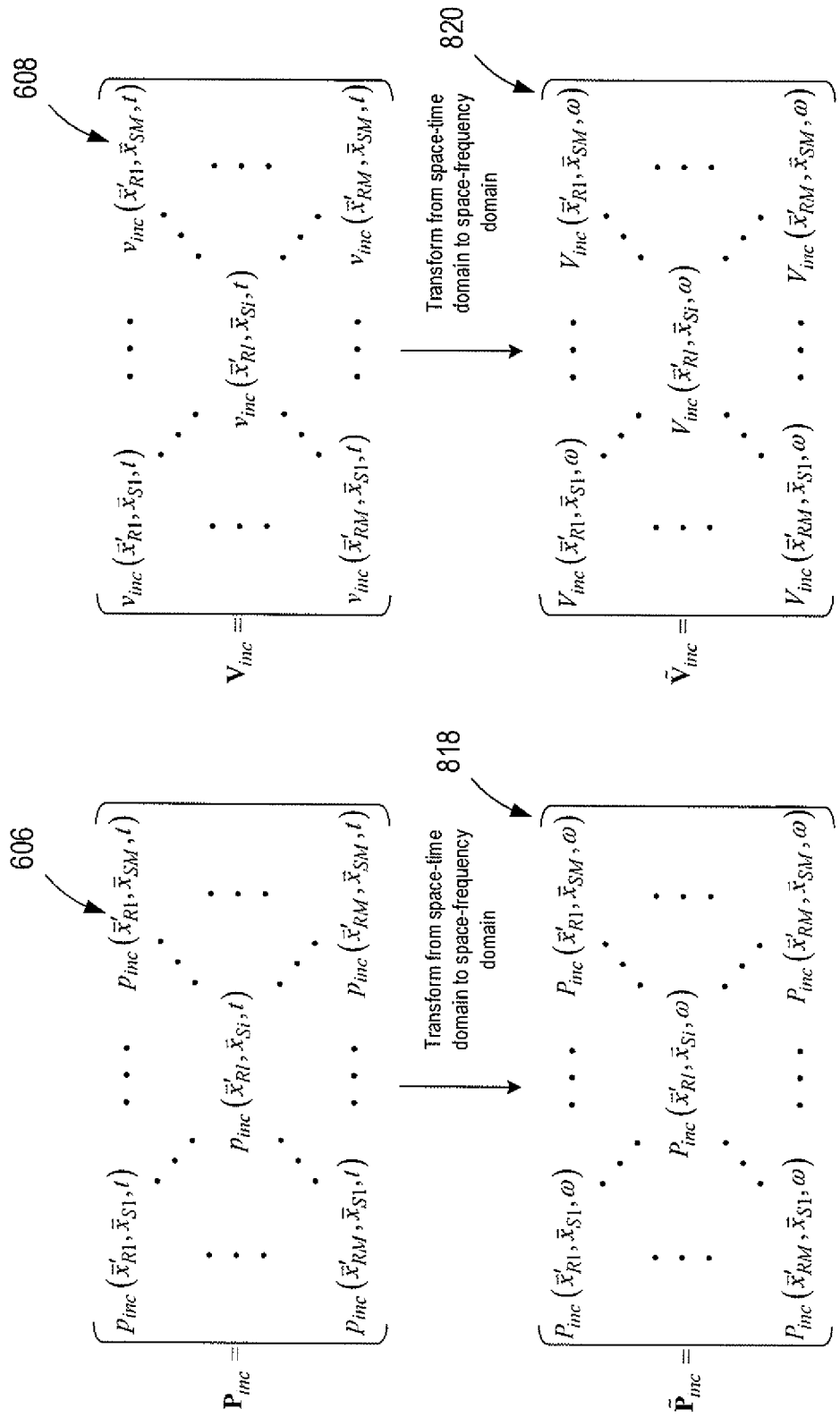
Figure 13:
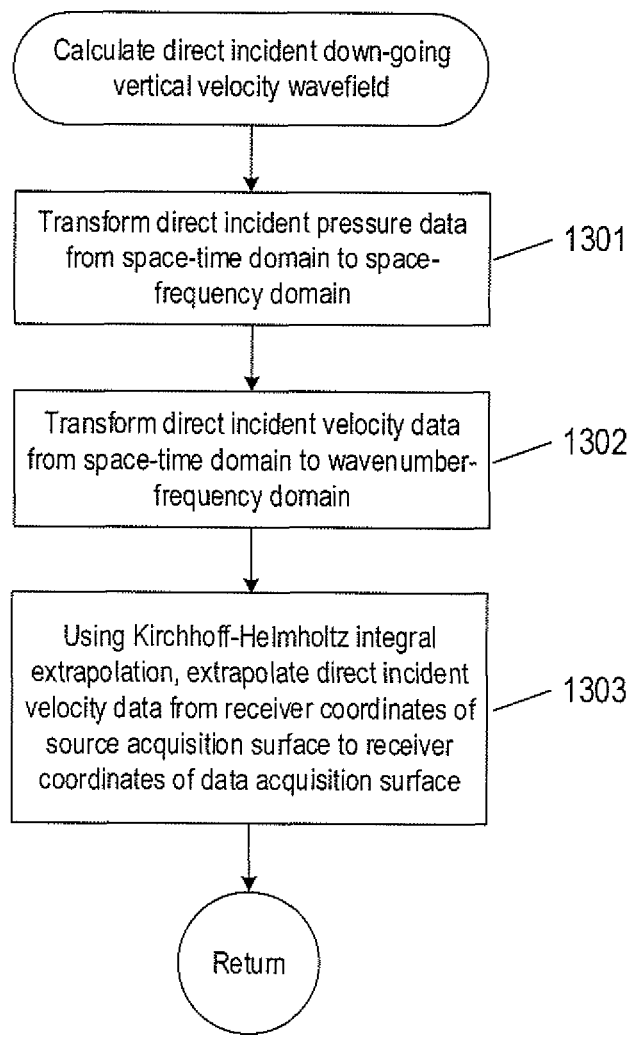
FIG. 13 shows a flow diagram of a routine "calculate direct incident down-going velocity wavefield" called in the flow diagram of FIG. 11.

FIGS. 8B-8C show calculation of direct incident down-going velocity wavefield $V_{inc}^+$ from the direct incident pressure wavefield $P_{inc}$ 606 and the direct incident velocity wavefield $V_{inc}$ 608. The superscription "+" denotes down-going. In FIG. 8B, each element of the direct incident pressure wavefield $P_{inc}$ 606 is transformed from the s-t domain to the s-f domain to obtain direct incident pressure wavefield $\tilde{P}_{inc}$ 818 in the s-f domain. Each element of the direct incident velocity wavefield $V_{inc}$ 608 is transformed from the s-t domain to the s-f domain to obtain a direct incident velocity wavefield $\tilde{V}_{inc}$ 820 in the s-f domain. In FIG. 8C, extrapolation 822 is used to calculate the direct incident down-going velocity wavefield $V_{inc}^+$ 824 at the data acquisition surface from the direct incident pressure wavefield $\tilde{P}_{inc}$ 818 and the direct incident velocity wavefield $\tilde{V}_{inc}$ 820 in the s-f domain. Extrapolation 822 may be carried by applying Kirchhoff-Helmholtz integral extrapolation given by:

$$\int_S dS[G_k(\vec{x}, \vec{r})i\omega\rho V_{inc}^+(\vec{x}_{Rl}, \vec{x}_{Si}, \omega)] = \qquad (10a)$$
$$\int_S dS[P_{inc}(\vec{x}'_{Rl}, \vec{x}_{Si}, \omega)\nabla_r G_k(\vec{x}'_{Rl}, \vec{x}_{Sg}) - G_k(\vec{x}'_{Rl}, \vec{x}_{Sg})i\omega\rho V_{inc}(\vec{x}'_{Rl}, \vec{x}_{Si}, \omega)]$$

where
$G_k$ is a Green's function in water;
S is a closed hemisphere as shown in FIG. 13;
$V_{inc}(\vec{x}'_{Rl}, \vec{x}_{Si}, \omega)$ is the direct incident velocity wavefield;
$P_{inc}(\vec{x}'_{Rl}, \vec{x}_{Si}, \omega)$ is the direct incident pressure wavefield; and
$V_{inc}^+(\vec{x}_{Rl}, \vec{x}_{Si}, \omega)$ is the direct incident down-going velocity wavefield.

The right-hand side of Equation (10a) comprises known quantities direct incident velocity wavefield $V_{inc}$, pressure $P_{inc}$, and $G_k$ the Green function in water obtained from the source acquisition surface. The only unknown quantity in Equation (10a) is the direct incident down-going velocity wavefield $V_{inc}^+$ at the receivers of the data acquisition surface. Equation (10a) may be obtained numerically by transforming the integral equation (10a) into a matrix equation and solving of the direct incident down-going velocity wavefield given by:

$$2i\omega\rho V_{inc}^+(\vec{x}_{Rl}, \vec{x}_{Si}, \omega) \qquad (10b)$$

where $-2i\omega\rho$ is a scale factor.

When the particle motion sensors are contaminated with mechanical vibration noise, two or more pressure sensors located at different radial positions of the source acquisition surface enable calculation of the normal derivative of the direct incident pressure data, $\vec{n} \cdot \nabla P_{inc}(\vec{x}'_{Rl}, \vec{x}_{Si}, \omega)$ at the source acquisition surface. As a result, direct incident velocity data may be approximated by $$V_{inc}(\vec{x}'_{Rl}, \vec{x}_{Si}, \omega) \approx -\frac{i}{\rho\omega}\vec{n}\cdot\nabla P_{inc}(\vec{x}'_{Rl}, \vec{x}_{Si}, \omega)$$

where

∇ is the gradient operator; and $\vec{n}$ is directed normal to the source acquisition surface.

The two or more pressure sensor may be used instead of the particle motion sensors when the particle motion sensors are contaminated by mechanical vibration noise.

A source deghosted and designatured up-going pressure wavefield matrix relates the up-going pressure wavefield matrix $P^-$ 816 to the direct incident down-going velocity wavefield $V_{inc}^+$ 820 as follows:

$$P^- = P^{-+}V_{inc}^+ \qquad (11)$$

where $P^{-+}$ is an M×M source deghosted and designatured up-going pressure wavefield matrix.

FIG. 9 shows Equation (11). Matrix elements of the source deghosted and designatured up-going pressure wavefield $P^{-+}$ 902 are represented as follows:

$$P^{-+}(\vec{x}_{Rl}, \vec{x}_{Si}, \omega) \qquad (12)$$

Derivation of Equation (11) is described below in the APPENDIX.

The source deghosted and designatured up-going pressure wavefield $P^{-+}$ 902 may be calculated from the up-going pressure wavefield $P^-$ 816 and the direct incident down-going velocity wavefield $V_{inc}^+$ 820 as follows:

$$P^{-+} = P^-(\overline{V_{inc}^+})^T[V_{inc}^+(\overline{V_{inc}^+})^T + I\varepsilon]^{-1} \qquad (13)$$

where

I is an M×M identity matrix;

ε is a stabilization contrast greater than zero;

$\overline{V_{inc}^+}$ is the complex conjugate the direct incident down-going velocity wavefield $V_{inc}^+$;

superscript "T" represent matrix transpose; and superscript "−1" represent inverse of the matrix $V_{inc}^+(\overline{V_{inc}^+})^T + I\varepsilon$.

The up-going pressure wavefield $P^-$ 816 is the pressure wavefield without the down-going pressure wavefield (i.e., the up-going pressure wavefield $P^-$ does not contain receiver ghost effects). In Equation (13), the matrix $$(\overline{V_{inc}^+})^T[V_{inc}^+(\overline{V_{inc}^+})^T + I\varepsilon]^{-1}$$

is a source deghosting and source designature operator that when applied to the up-going pressure wavefield $P^-$ 816 as represented by Equation (13) deconvolves the source signature effects and the source ghost effects from the up-going pressure wavefield $P^-$ to give the source deghosted and source designatured up-going pressure wavefield $P^{-+}$ 902 in the s-f domain. As a result, the source deghosted and designatured up-going pressure wavefield $P^{-+}$ 902 is substantially free of receiver ghost effects, source ghost effects and the source signature effects. The elements of the source deghosted and designatured up-going pressure wavefield $P^{-+}$ 902 may be transformed using an inverse FFT or inverse DFT to give receiver deghosted (i.e., removal of the down-gong wavefield), source deghosted, and source designatured pressure data as follows:

$$P^{-+}(\vec{x}_{Rl}, \vec{x}_{Si}, \omega) \rightarrow P^{-+}(\vec{x}_{Rl}, \vec{x}_{Si}, t) \qquad (14)$$

The pressure data $p(\vec{x}_{Rl}, \vec{x}_{Si}, t)$ of the pressure wavefield P 602 includes source ghosts, a receiver ghost, and source wavefield as described above with reference to FIG. 4. The corresponding source deghosted and designatured up-going pressure data $p^{-+}(\vec{x}_{Rl}, \vec{x}_{Si}, t)$ is substantially free of the receiver ghost, source ghost, and the source signature effects created by of the source wavefield. Imaging techniques may then be used to calculate seismic data images of a subterranean formation from the source deghosted and designatured up-going pressure wavefield $P^{-+}$ 902. The seismic data images may reveal structural information of a subterranean formation that are substantially free of receiver ghost effects, source ghost effects, and are free of the source signature effects.

FIG. 10 shows the four example traces 400 described above with reference to FIG. 4. Each of the traces may be four pressure data elements in a pressure wavefield P in the s-t domain. A plot of four example traces 1000 represents the four example traces 400 after calculation of the source deghosted and designatured up-going pressure wavefield $P^{-+}$ as represented by Equation (13). Each of the traces has been receiver deghosted (i.e., removal of the down-going wavefields 424, 425, 428 using wavefield separation in Equation (8) because these wavefields are down-going), source deghosted (i.e., removal of source ghost effects 427 and 429), and source designatured (i.e., deconvolution of the source signature), leaving the up-going reflected wavefield 426 with source signature deconvolved into band limited spikes, such as spike 1002.

Calculation of the source deghosted and designatured up-going pressure wavefield $P^{-+}$ 902 according to Equation (13) is independent of any assumptions about the state of the free surface at the time the pressure data, vertical velocity data, direct incident pressure data, and the direct incident velocity data are collected. As a result, Equation (13) may be used to calculate the source deghosted and designatured up-going pressure wavefield $P^{-+}$ 902 using pressure data, vertical velocity data, and direct incident pressure and velocity data collected under nearly any conditions, including harsh weather conditions with a rough free surface.

Alternatively, assuming a flat free surface, elements of a source deghosted and designatured up-going pressure wavefield $P^{-+}$ may be calculated in source w-f domain from elements of the up-going pressure wavefield $P^-$ 816 and the direct incident down-going velocity wavefield $V_{inc}^+$ 820, both in the source w-f domain. For each common-receiver gather, elements of the source deghosted and designatured up-going pressure wavefield $P^{-+}$ may be calculated as follows:

$$P^{-+}(\vec{x}_{Rl}, \vec{k}_S, \omega) = \frac{-\exp(-i\vec{k}_S\chi_R)}{2i\omega\rho}\frac{P^-(\vec{x}_{Rl}, \vec{k}_S, \omega)}{V_{inc}^+(\vec{x}_{Rl}, \vec{k}_S, \omega)} \qquad (15)$$

where $\vec{k}_S = (k_{Sx}, k_{Sy})$ is a horizontal source wavenumber;

$(\vec{k}_S, \omega)$ is in the source w-f domain;

$P^-(\vec{x}_{Rl}, \vec{k}_S, \omega)$ is up-going pressure wavefield in source w-f domain; and $V_{inc}^+(\vec{x}_{Rl}, \vec{k}_S, \omega)$ is direct incident down-going velocity wavefield in source w-f domain.

Equation (15) represents deconvolving the source ghost and source signature effects represented by $V_{inc}^+(\vec{x}_{Rl}, \vec{k}_S, \omega)$ from the up-going pressure data $P^-(\vec{x}_{Rl}, \vec{k}_S, \omega)$ by spectral division in the source wavefield-frequency domain. For each index 1 and i, elements of the source deghost and source designatured up-going pressure wavefield P$^{-+}$ are inverse transformed from the source w-f domain to the s-f domain:

$$p^{-+}(\vec{x}_{Rb}\vec{k}_S,\omega) \rightarrow P(\vec{x}_{Rb}\vec{x}_{Sb}\omega) \qquad (16)$$

which may in turn be transformed from the s-f domain to the s-t domain, as described above with reference to Equation (14).

Figure 11:
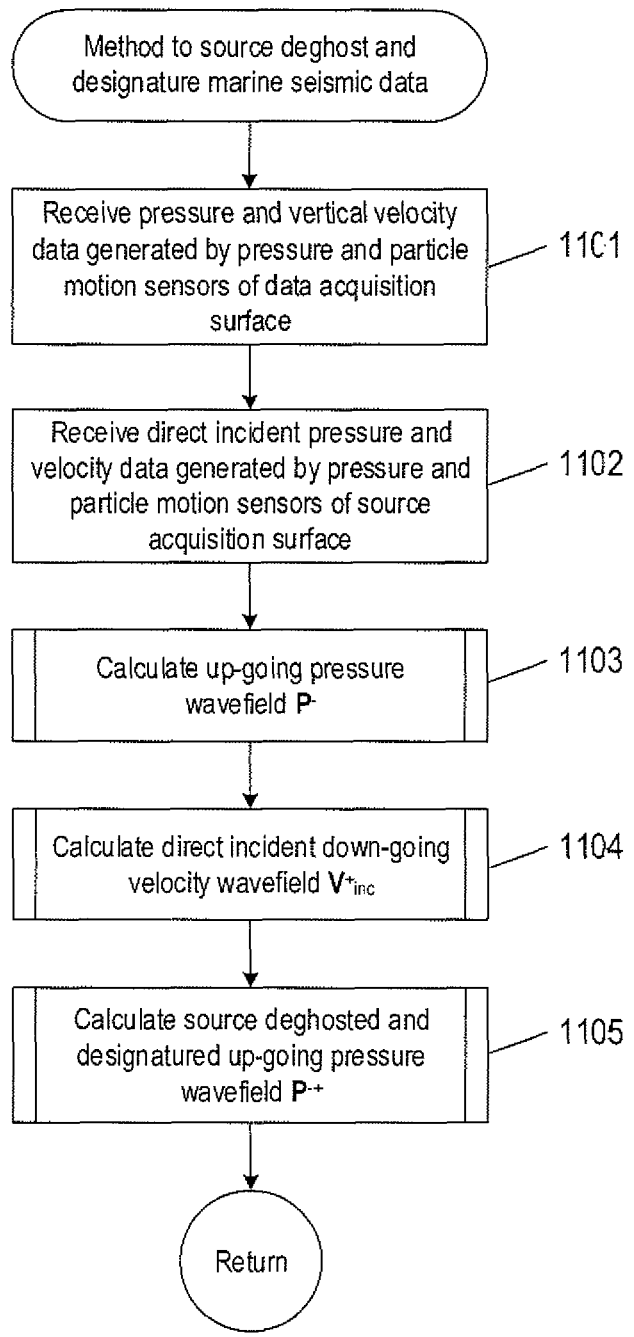
FIG. 11 shows a flow diagram of a method to generate source deghosted and source designatured up-going pressure data.

FIG. 11 shows a flow diagram of a method to generate source deghosted and source designatured up-going pressure wavefield. In block 1101, M sets of pressure data and M sets of vertical velocity data generated by M collocated pressure and particle motion sensors may be received from a data-storage device. Each set of pressure data and each set of vertical velocity data is collected in a time interval or spatial interval along a sail line after each activation of a seismic source, as described above with reference to FIG. 5A. In block 1102, M sets of direct incident pressure and velocity data generated by M pressure and particle motion sensors of a source acquisition surface may be received from a data-storage device. In block 1103, a routine "calculate up-going pressure wavefield" is called to calculate an up-going pressure wavefield from the pressure and vertical velocity data. In block 1104, a routine "calculate direct incident down-going velocity wavefield" is called to calculate a direct incident down-going velocity wavefield based on the direct incident pressure and velocity data. In block 1105, a routine "calculate source deghosted and designatured up-going pressure wavefield" is called to calculate a source deghosted and designatured up-going pressure wavefield based on the up-going pressure wavefield and the direct incident down-going velocity wavefield.

Figure 12:
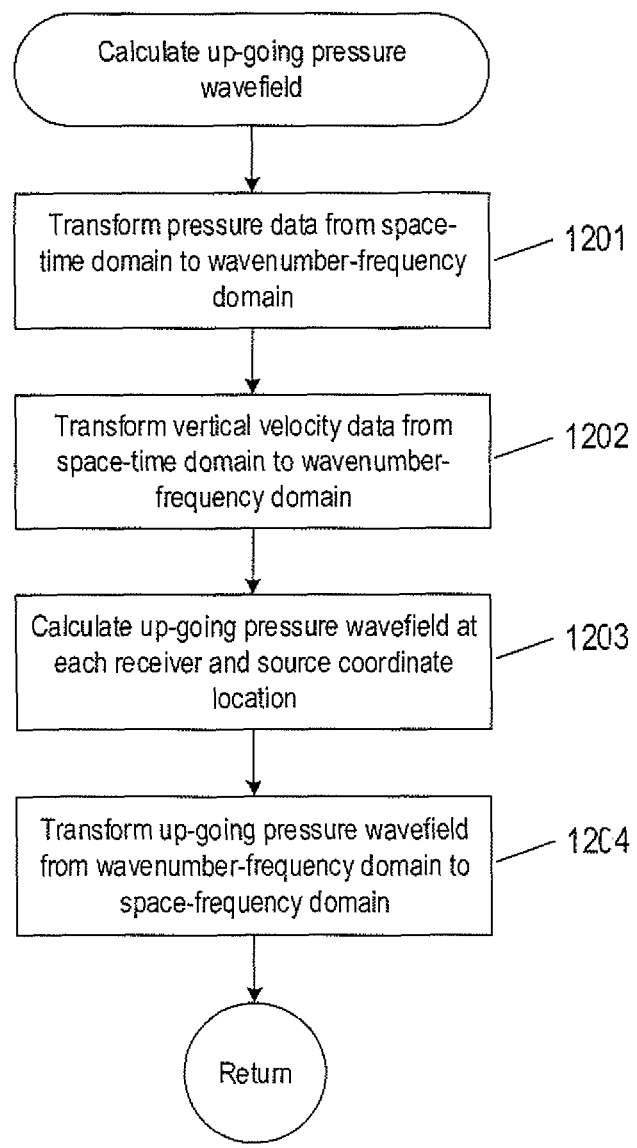
FIG. 12 shows a flow diagram of a routine "calculate up-going pressure wavefield" called in the flow diagram of FIG. 11.

FIG. 12 shows a flow diagram of the routine "calculate up-going pressure wavefield" called in block 1103 of FIG. 11. In block 1201, the pressure data is transformed from the s-t domain to the w-f domain, as described above with reference to Equation (6). In block 1202, the vertical velocity data is transformed from the s-t domain to the w-f domain, as described above with reference to Equation (7). In block 1203, the up-going pressure wavefield is calculated for each receiver and source coordinate location, as described above with reference to Equation (8). In block 1204, the up-going pressure wavefield is transformed from the w-f domain to the s-f domain, as described above with reference to FIG. 8A and Equation (9).

FIG. 13 shows a flow diagram of the routine "calculate direct incident down-going velocity wavefield" called in block 1104 of FIG. 11. In block 1301, the direct incident pressure data is transformed from the s-t domain to the s-f domain, as described above with reference to FIG. 8B. In block 1302, the direct incident velocity data is transformed from the s-t domain to the s-f domain, as described above with reference to FIG. 8B. In block 1303, the direct incident velocity data is extrapolated from the receiver coordinates of the source acquisition surface to receiver coordinates of the data acquisition surface based on the direct incident pressure and velocity data in the s-f domain, as described above with reference to Equations (10a)-(10b).

Figure 14:
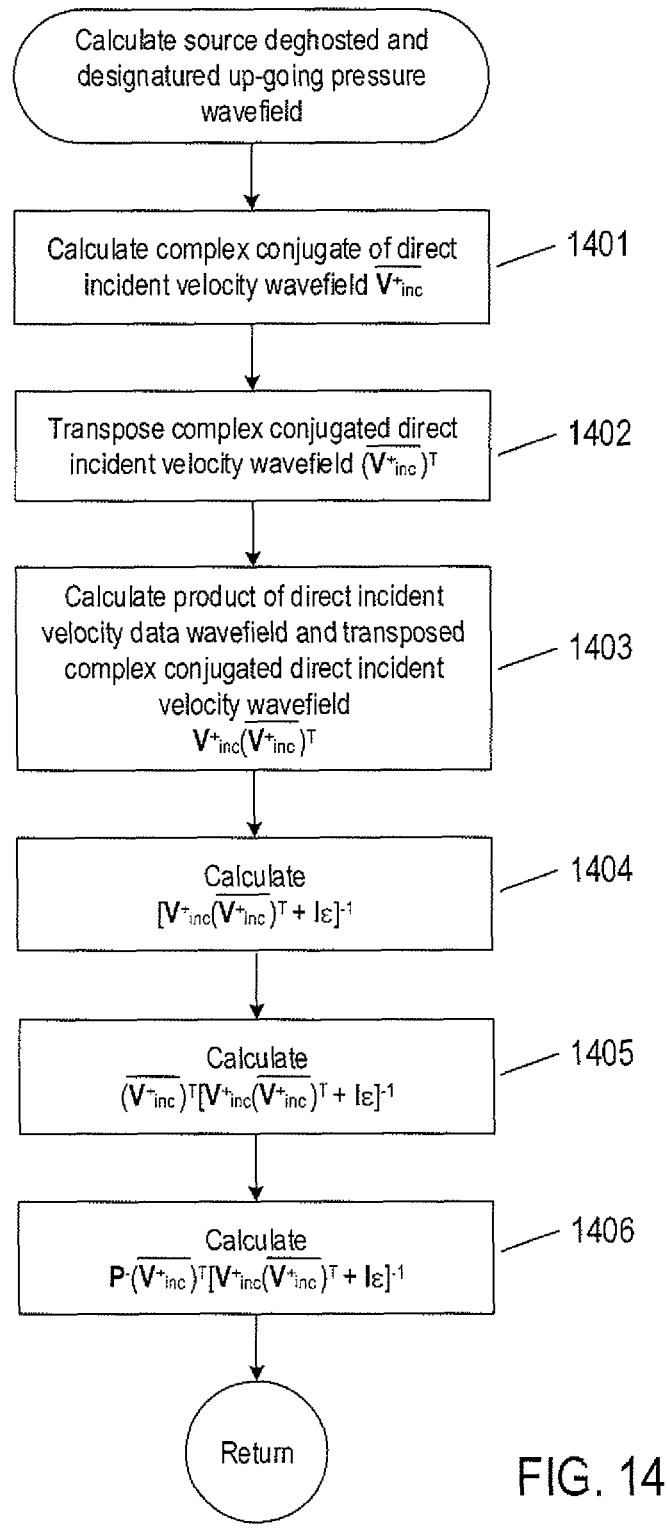
FIG. 14 shows a flow diagram of the routine "calculate source deghosted and designatured up-going pressure wavefield" called in the flow diagram of FIG. 11.

FIG. 14 shows a flow diagram of the routine "calculate source deghosted and designatured up-going pressure wavefield" called in block 1105. In block 1401, complex conjugate of the direct incident down-going velocity wavefield, $\overline{V_{inc}^+}$, is calculated. In block 1402, elements of the complex conjugated of the direct incident down-going velocity wavefield are transposed $(\overline{V_{inc}^+})^T$. In block 1403, a product of the direct incident down-going velocity wavefield and the transposed complex conjugated direct incident down-going velocity wavefield is calculated to obtain $V_{inc}^+(\overline{V_{inc}^+})^T$. In block 1404, an inverse matrix $[V_{inc}^+(\overline{V_{inc}^+})^T + I\varepsilon]^{-1}$ is calculated from $V_{inc}^+(\overline{V_{inc}^+})^T$ and scaling factor $\varepsilon$. In block 1405, a source deghosting and source designature operator $(\overline{V_{inc}^{+T}} [V_{inc}^+(\overline{V_{inc}^+})^T + I\varepsilon]^{-1}$ is calculated. In block 1406, a source deghosted and source designatured up-going pressure wavefield matrix P$^{-+}$ is calculated by multiplying the matrix representing the up-going pressure wavefield P$^-$ by the source deghosting and source designature operator calculated in block 1405, as described above with reference to Equation (13).

Figure 15:
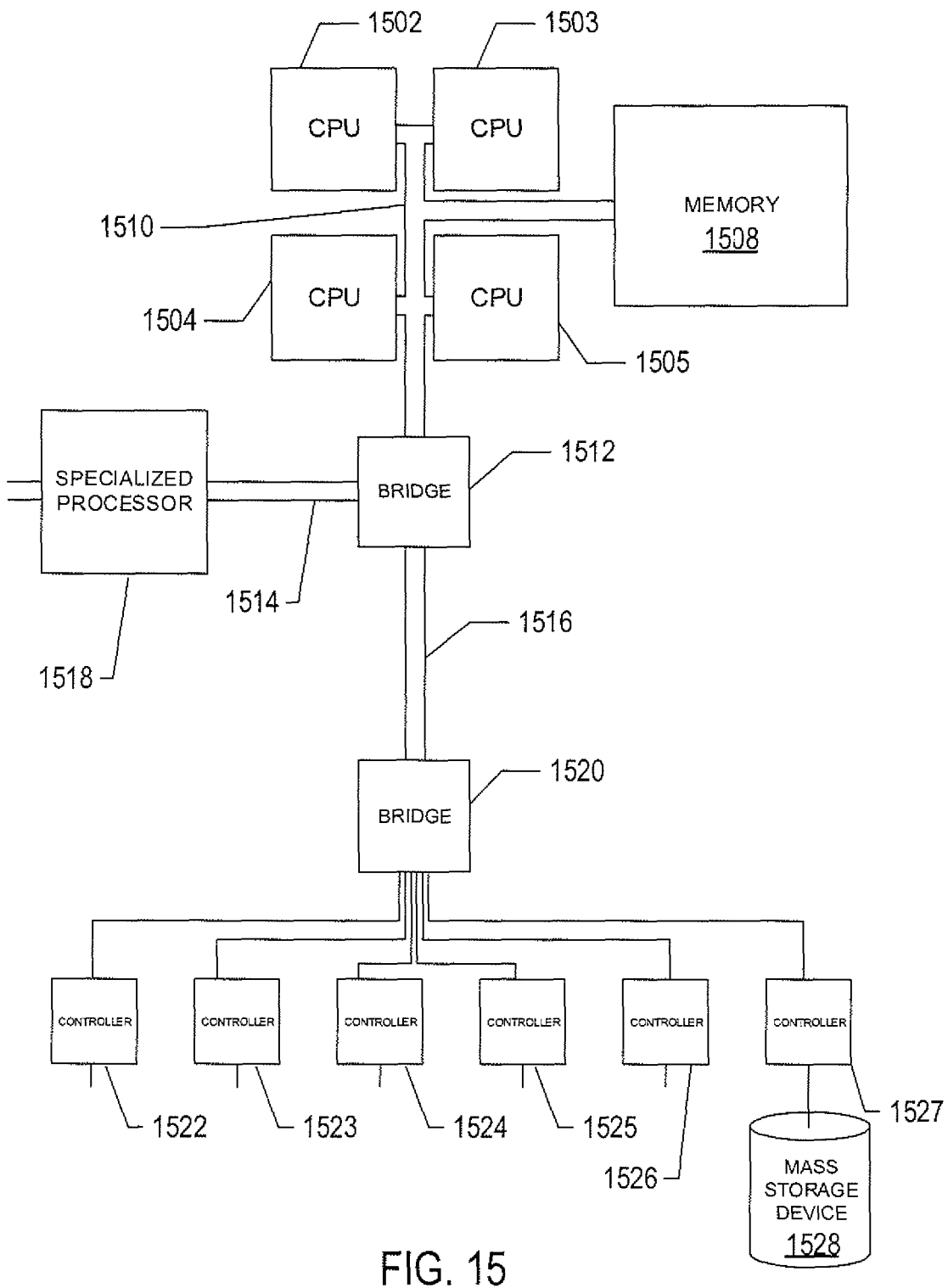
FIG. 15 shows an example of a computer system that executes efficient methods of calculating source deghosted and designatured up-going pressure data.

FIG. 15 shows an example of a computer system that executes efficient methods of calculating source deghosted and designatured up-going pressure wavefield and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1502-1505, one or more electronic memories 1508 interconnected with the CPUs by a CPU/memory-subsystem bus 1510 or multiple busses, a first bridge 1512 that interconnects the CPU/memory-subsystem bus 1510 with additional busses 1514 and 1516, or other types of high-speed interconnection media, including multiple, high-speed serial interconnects. The busses or serial interconnections, in turn, connect the CPUs and memory with specialized processors, such as a graphics processor 1518, and with one or more additional bridges 1520, which are interconnected with high-speed serial links or with multiple controllers 1522-1527, such as controller 1527, that provide access to various different types of computer-readable media, such as computer-readable medium 1528, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1528 is a data-storage device, including electronic memory, optical or magnetic disk drive, USB drive, flash memory and other such data-storage device. The computer-readable medium 1528 can be used to store machine-readable instructions that encode the computational methods described above and can be used to store encoded data, during store operations, and from which encoded data can be retrieved, during read operations, by computer systems, data-storage systems, and peripheral devices.

The source deghosted and designatured up-going pressure wavefield produced by the methods described above is a geophysical data product that is representative of structural information of a subterranean formation. The geophysical data includes the pressure data and vertical velocity data generated by a data acquisition surface and direct incident pressure data and direct incident velocity data generated by a source acquisition surface, which are used to generate the source deghosted and designatured up-going pressure wavefield. The source deghosted and designatured up-going pressure wavefield may be used to calculate seismic image of a subterranean formation, which is a geophysical data product that reveals structural information, such as the configuration of layers and deposits, within the subterranean formation. The geophysical data product may be stored on a non-transitory computer-readable medium as described above. The geophysical data product may be produced offshore (i.e., by equipment on the survey vessel 102) or onshore (i.e., at a computing facility on land) either within the United States or in another country. When the geophysical data product is produced offshore or in another country, it may be imported onshore to a data-storage facility in the United States. Once onshore in the United States, geophysical analysis may be performed on the geophysical data product.

APPENDIX

Figures 16A, 16B:
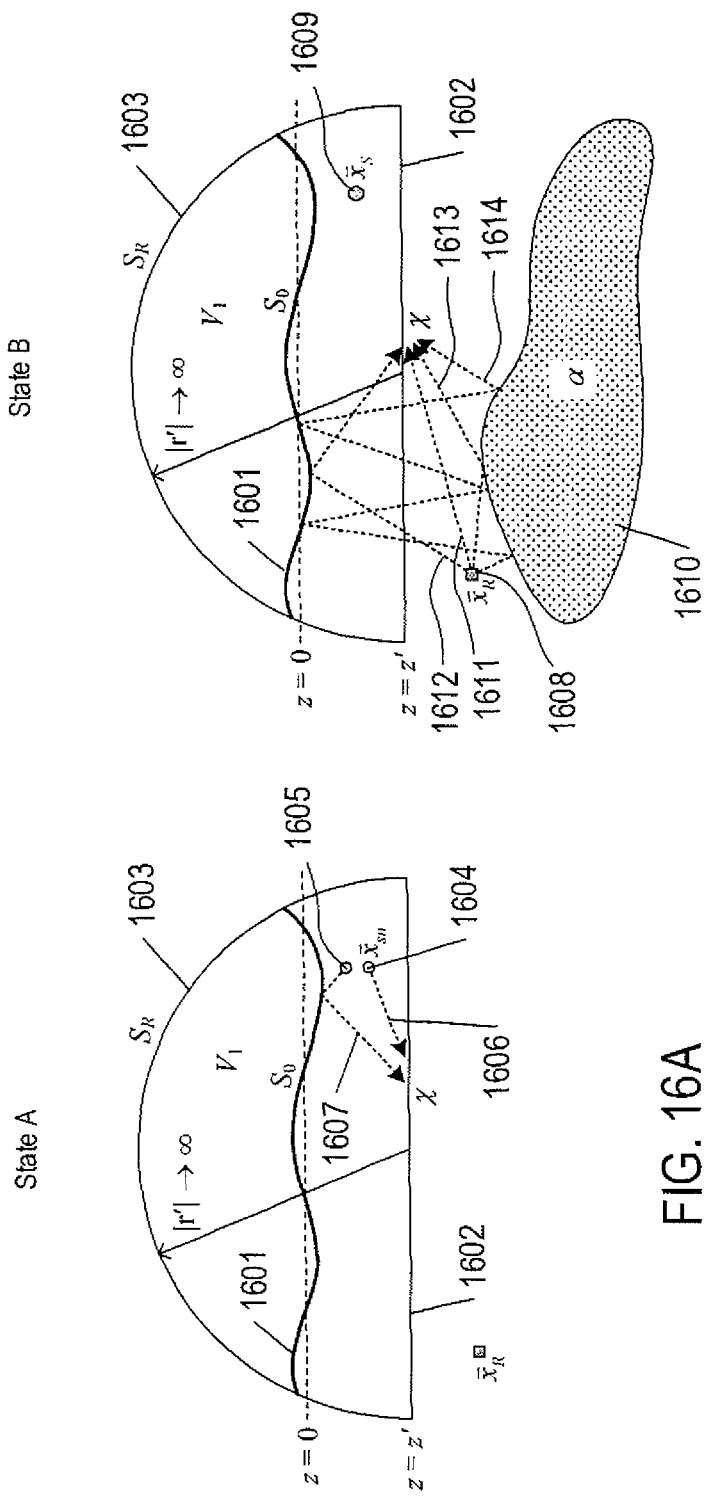
FIGS. 16A and 16B show side-elevation views of two states identified as State A and State B of an acoustic model.

In this APPENDIX a derivation of the matrices $P^-$, $V_{zinc}^+$, and $P^{-+}$ in the s-f domain of Equation (11) is presented. FIGS. 16A and 16B show side-elevation views of two states identified as State A and State B, respectively, of an acoustic model. Curve 1601 represents the free surface, denoted by $S_0$, of a body of water. A line segment 1602 represents a measurement level located at a depth $z=z'$ below the free surface free surface $S_0$ 1601. A semicircular curve $S_R$ 1603 connected to the ends of the measurement level 1602 forms an enclosed hemisphere S with a volume $V_1$ that encloses the free surface $S_0$ 1601.

In FIG. 16A, State A represents an acoustic half-space model separated by the free surface $S_0$ 1601. Shaded circles, such as shaded circles 1604 and 1605, represent source elements of a source located at coordinate locations denoted by $\vec{x}_{sn}$ between the free surface 1601 and the measurement level 1602, where lowercase subscript "s" denotes a source element, n is a source element index with $n=1, \ldots, N$, and N is the number of source elements that form the source. The signature of the nth source element is denoted by $s_n$. Dashed line directional arrow 1606 represents a portion of a source wavefield generated by the source element 1604 that travels directly from the source element 1604 to a point on the measurement level 1602 denoted by $\chi$. Bent dashed line directional arrow 1607 represent a portion of source wavefield generated by the source element 1605 that is reflected from the free surface $S_0$ 1601 to the point $\chi$.

In FIG. 16B, State B represents a reciprocal model that matches a real physical model. In the reciprocal model of State B, the source wavefield is generated by a monopole point source 1608 located at a receiver coordinate location $\vec{x}_R$ below the measurement level 1602, and a receiver 1609 is located at source coordinate location $\vec{x}_S$ above the measurement level 1602 and inside the enclosed hemisphere. A shaded region 1610 denoted by $\alpha$ represents a region of a subterranean formation. Dashed lines 1611-1614 represents paths that different portions of the source wavefield generated by the point source 1608 take in reaching the point $\chi$ on the measurement level 1602. Dashed line 1611 represents a portion of the source wavefield that travels directly from the point source 1608 to the point $\chi$. Dashed line 1612 represents a portion of the source wavefield that is first reflected from the free surface $S_0$ 1601 before reaching the point $\chi$. Dashed line 1613 represents a portion of the source wavefield that is reflected from the region 1610 be reaching the point $\chi$ and represents a primary reflection. Dashed line 1614 represents a portion of the source wavefield that is twice reflected from the free surface and three times reflected from the region 1610 before reaching the point $\chi$ and represents a multiple reflection.

Rayleigh's reciprocity theorem (See Fokkema, J. T. and P. M. van den Berg, *Seismic applications of acoustic reciprocity*, Elsevier Science Publication Co. Inc., 1993; and Amundsen L., Elimination of free surface related multiples with need of the source wavelet, *Geophysics*, 66, 327-341, 2001) applied to the models represented by States A and B, reduces a closed integral over the volume $V_1$ to an integral equation that relates the models in States A and B as follows:

$$\sum_{n=1}^{N} s_n P_B(\vec{x}_R, \vec{x}_{sn}) = \quad (17)$$

$$j\omega\rho \sum_{n=1}^{N} \int (P_A(\chi, z'|\vec{x}_{sn})V_{z,B}(\vec{x}_R|\chi, z') - P_B(\vec{x}_R|\chi, z')$$

$$V_{z,A}(\chi, z'|\vec{x}_{sn}))d\chi$$

where

N is the number of source elements of the source;

$\chi$ represents x and y coordinates on the measurement level 1602;

$s_n$ represents a notional source signature of the nth source element;

$P_A(\chi,z'|\vec{x}_{sn})$ is the pressure measured in State A;

$V_{z,A}(\chi,z'|\vec{x}_{sn})$ is the vertical velocity measured in State A;

$P_B(\vec{x}_R,\vec{x}_{sn})$ is the pressure measured in State B; and $V_{z,B}(\vec{x}_R|\chi,z')$ is the vertical velocity measured in State B. Equation (17) relates the model in State A to the reciprocal model in State B.

Sommerfeld's radiation condition applied to Equation (17) reduces the closed integration surface to integration in the plane $z=z'$. Interchanging summation and integration on the right-hand side of Equation (17) gives $$\sum_{n=1}^{N} s_n P_B(\vec{x}_R, \vec{x}_{sn}) = j\omega\rho \int (P_{inc}(\chi, z'|\vec{x}_S)V_{z,B}(\vec{x}_R|\chi, z') - \quad (18)$$

$$P_B(\vec{x}_R|\chi, z')V_{inc}(\chi, z'|\vec{x}_S))d\chi$$

where $P_{inc}(\chi,z'|\vec{x}_S) = \sum_{n=1}^{N} P_A(\chi,z'|\vec{x}_{sn})$; and $V_{inc}(\chi,z'|\vec{x}_S) = \sum_{n=1}^{N} V_{z,A}(\chi,z'|\vec{x}_{sn})$.

The quantities $P_{inc}(\chi,z'|\vec{x}_S)$ and $V_{inc}(\chi,z'|\vec{x}_S)$ are respectively the pressure and vertical velocity wavefields generated by the source elements that may be activated simultaneously or activated with predefined source element delays and recorded at the measurement level 1302 in the State A (i.e., the actual direct incident wavefield including the source ghosts). The coordinate location $\vec{x}_S$ is the coordinate location of the center of the source.

In a small source-free depth interval at the level $z=z'$ of the measurement level 1302, wavefield separation is used to obtain a wavefield identity given by $$\int_{\partial V_1} (P_{inc}(\chi, z'|\vec{x}_S)V_{z,B}(\vec{x}_R|\chi, z') - P_B(\vec{x}_R|\chi, z')V_{inc}(\chi, z'|\vec{x}_S)) \quad (19)$$

$$dS = 2\int_{\partial V_1} (P_{inc}^-(\chi, z'|\vec{x}_S)V_{inc}^+(\vec{x}_R|\chi, z') +$$

$$V_{inc}^-(\vec{x}_R|\chi, z')P_B^+(\chi, z'|\vec{x}_S))dS$$

(See Wapenaar, K., and A. J. Berkout, *Elastic wavefield extrapolation*; Elsevier Science Publication Co. Inc., 1989; and Wapenaar, K. et al. Seismic and electromagnetic controlled-source interferometry in dissipative media: *Geophysical Prospecting*, 56, 419-434, 2008) Based on the identity given in Equation (19) and using the fact that there is no up-going wavefield at the level of the measurement level z=z' below the source elements in State A, Equation (18) reduces to $$\sum_{n=1}^{N} s_n P_B(\vec{x}_R, \vec{x}_{sn}) = -2j\omega\rho \int (P_B^-(\vec{x}_R | \chi, z') V_{inc}^+(\chi, z' | \vec{x}_S)) d\chi \quad (20)$$

Figures 17A, 17B:
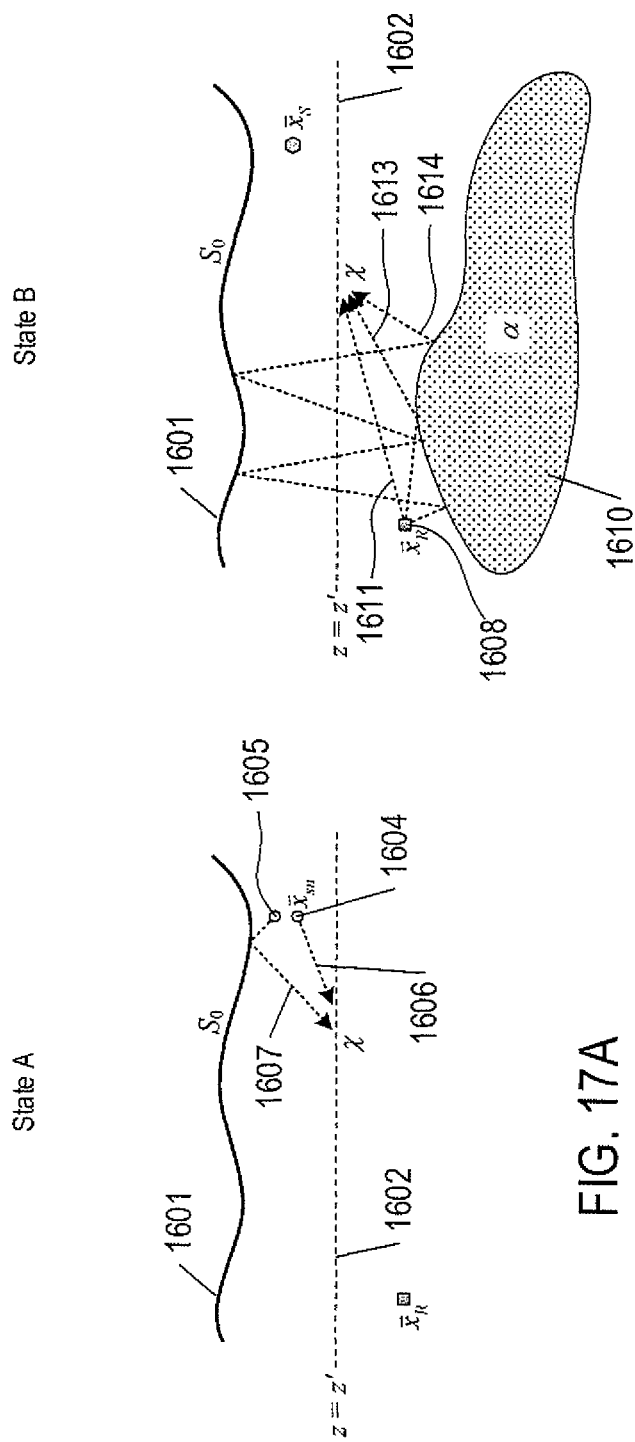
FIGS. 17A-17B show State A and State B after wavefield separation.

FIGS. 17A-17B show the State A and State B after wavefield separation. As represented by State B in FIG. 14B, applying Rayleigh's reciprocity theorem and the identity given in Equation (19) removes the portion of the source wavefield that is reflected from the free surface $S_0$ 1601 before reaching the point χ represented by directional arrow 1612 in FIG. 16B. As a result, Equation (20) relates the States A and B shown in FIGS. 17A and 17B respectively, but without the portion of the source wavefield reflected from the free surface $S_0$ 1601 represented by directional arrow 1612 in FIG. 16B.

Applying source-receiver reciprocity in State B and taking only the up-going part of the wavefields gives:

$$P^-(\vec{x}_R, \vec{x}_S) = -2j\omega\rho \int (P_B^{-+}(\vec{x}_R|\chi,z') V_{inc}^+(\chi,z'|\vec{x}_S)) d\chi \quad (21)$$

where $P^-(\vec{x}_R,\vec{x}_S) = \sum_{n=1}^{N} s_n P_B(\vec{x}_R, \vec{x}_{sn})$ is the up-going pressure wavefield.

The summation over the source element on the left-hand side of Equation (20) reduces to the up-going pressure wavefield $P^-(\vec{x}_R,\vec{x}_S)$ on the left-hand side of Equation (21), because the source-receiver reciprocal of the pressure wavefields in the State B (on the left-hand side of Equation (20)) are Green's functions multiplied by the individual source element signatures $s_n$ summed over all N source elements. The up-going pressure wavefield $P^-(\vec{x}_R,\vec{x}_S)$ result from a source wavefield generated by the source $\vec{x}_S$ and measured at the receiver position $\vec{x}_R$.

Equation (21) relates the up-going pressure wavefield $P^-(\vec{x}_R,\vec{x}_S)$ as a coupling of the two wavefields in the surface integral on the right-hand side of Equation (17). These two wavefields are the direct incident down-going velocity wavefield $V_{inc}^+(\chi,z'|\vec{x}_S)$ at the measurement level 1602 (State A) and the total up-going pressure wavefield $P_B^{-+}(\vec{x}_R|\chi,z')$ at the measurement level 1602 (State B). Note that because the total up-going pressure wavefield $P_B^{-+}(\vec{x}_R|\chi,z')$ is obtained by source-receiver reciprocity application from an initially up-going pressure wavefield at the measurement level 1602, the up-going pressure wavefield $P_B^{-+}(\vec{x}_R|\chi,z')$ is consequently purely down-going on the source side as indicated by the superscript "+". In other words, the up-going pressure wavefield $P_B^{-+}(\vec{x}_R|\chi,z')$ is an up-going pressure wavefield with respect to a Dirac impulse as a source signature and down-going at the source location. As a result, the up-going pressure wavefield $P_B^{-+}(\vec{x}_R|\chi,z')$ is a receiver-side and source-side deghosted wavefield with the source signature removed.

FIGS. 18A-18B show direct incident down-going velocity wavefield (State A) and designatured and source deghosted up-going pressure wavefield (State B). In FIG. 18A, the direct incident down-going velocity wavefield $V_{inc}^+(\chi,z'|\vec{x}_S)$ represent the portions of the source wavefields that travel directly from the source elements to point χ on the acquisitions surface 1602 and the portions of the source wavefields that are reflected from the free surface $S_0$ 1601 to the point χ on the measurement level 1602, as represented by directional arrows 1606 and 1607. In FIG. 18B, the designatured and source deghosted up-going pressure wavefield $P_B^{-+}(\vec{x}_R|\chi,z')$ represents the up-going pressure wavefield as represented by directional arrow 1614 and the up-going multiples as represented by directional arrow 1613. The source deghosted and designatured up-going pressure wavefield $P_B^{-+}(\vec{x}_R|\chi,z')$ does not include the direct and reflected source wavefields represented by directional arrows 1611 and 1612 in FIG. 16B and does not include the down-going pressure wavefield.

From the known up-going pressure wavefield $P^-(\vec{x}_R,\vec{x}_S)$ and direct incident down-going velocity wavefield $V_{inc}^+(\chi,z'|\vec{x}_S)$, the source deghosted and designated up-going pressure wavefield $P_B^{-+}(\vec{x}_R|\chi,z')$ may be obtained by solving the integral Equation (20) for arbitrarily complex subsurface and free surface conditions.

Equation (21) derived above is a type of Fredholm integral equation of the first kind. A general solution of this integral equation involves contributions from sources within one receiver spread (i.e., ideally considering all the sources at every receiver position of the entire measurement level). In order to solve Equation (21) for the source deghosted and source designatured up-going wavefield $P_B^{-+}(\vec{x}_R|\chi,z')$, Equation (21) is rewritten in terms of the matrices $P^-$, $V_{z,inc}^+$, and $P^{-+}$ given in Equation (11) above and the source deghosted and source designatured up-going wavefield $P_B^{-+}(\vec{x}_R|\chi,z')$ are calculated in Equation (13) above.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process for generating an image of a subterranean formation using marine seismic techniques in which a source is activated above the subterranean formation and reflected wavefields from the subterranean formation are recorded as pressure and vertical velocity data generated by receivers, the specific improvement comprising:
    calculating an up-going pressure wavefield from pressure data and vertical velocity data generated by receivers of a data acquisition surface;
    calculating a direct incident down-going velocity wavefield from direct incident pressure and velocity data generated by receivers of a source acquisition surface;
    calculating a source deghosted and designatured up-going pressure wavefield from the up-going pressure wavefield and the direct incident down-going velocity wavefield; and generating an image of the subterranean formation using at least in part the source deghosted and designatured up-going pressure wavefield.

2. The process of claim 1, wherein calculating the up-going pressure wavefield comprises:
   transforming the pressure data from the space-time domain to the wavenumber-frequency domain;
   transforming the vertical velocity data from the space-time domain to the wavenumber-frequency domain;
   calculating the up-going pressure wavefield from the pressure data and the vertical velocity data in the wavenumber-frequency domain; and
   transforming the up-going pressure wavefield from the wavenumber-frequency domain to the space-time domain.

3. The process of claim 1, wherein calculating the direct incident down-going velocity wavefield comprises:
   transforming the direct incident pressure data from the space-time domain to the space-frequency domain;
   transforming the direct incident velocity data from the space-time domain to the space-frequency domain; and
   extrapolating the direct incident velocity data from the source acquisition surface to the data acquisition surface based on the direct incident pressure and velocity data in the space-frequency domain.

4. The process of claim 1, wherein calculating the source deghosted and designatured up-going pressure wavefield comprises:
   calculating a source deghosting and source designature operator from the direct incident down-going velocity wavefield; and
   multiplying the up-going pressure wavefield by the source deghosting and source designature operator to deconvolve source ghost effects and source signature effects from the up-going pressure wavefield.

5. The process of claim 4, wherein calculating the source deghosting and source designature operator further comprises:
   forming a matrix representation of the direct incident down-going velocity wavefield;
   calculating a complex conjugate of the matrix representation of the direct incident down-going velocity wavefield;
   transposing the complex conjugated matrix representation of the direct incident down-going velocity wavefield;
   calculating a product of the direct incident down-going velocity wavefield and the transposed complex conjugated direct incident down-going velocity wavefield;
   calculating an inverse matrix of the product; and
   multiplying the matrix representation of the direct incident down-going velocity wavefield by the inverse matrix to generate the source deghosting and source designature operator.

6. The process of claim 1, wherein calculating a source deghosted and designatured up-going pressure wavefield comprises:
   transforming the up-going pressure wavefield from the space-time domain to the source wavenumber-frequency domain;
   transforming the direct incident down-going velocity wavefield from the space-time domain to the source wavenumber-frequency domain; and
   deconvolving the direct incident down-going velocity wavefield from the up-going pressure wavefield by spectral division to generate the source deghosted and source designatured up-going pressure wavefield.

7. A system for generating an image of a subterranean formation, the system comprising:
   one or more processors;
   one or more data-storage devices; and
   machine-readable instructions stored in the one or more data-storage devices that when executed using the one or more processors controls the system to carry out
      calculating an up-going pressure wavefield from pressure data and vertical velocity data generated by receivers of a data acquisition surface in a marine survey of a subterranean formation;
      calculating a direct incident down-going velocity wavefield from direct incident pressure and velocity data generated by receivers of a source acquisition surface;
      calculating a source deghosted and designatured up-going pressure wavefield from the up-going pressure wavefield and the direct incident down-going velocity wavefield; and
      generating an image of the subterranean formation using at least in part the source deghosted and designatured up-going pressure wavefield.

8. The system of claim 7, wherein calculating the up-going pressure wavefield comprises:
   transforming the pressure data from the space-time domain to the wavenumber-frequency domain;
   transforming the vertical velocity data from the space-time domain to the wavenumber-frequency domain;
   calculating the up-going pressure wavefield from the pressure data and the vertical velocity in the wavenumber-frequency domain; and
   transforming the up-going pressure wavefield from the wavenumber-frequency domain to the space-time domain.

9. The system of claim 7, wherein calculating the direct incident down-going velocity wavefield comprises:
   transforming the direct incident pressure data from the space-time domain to the space-frequency domain;
   transforming the direct incident velocity data from the space-time domain to the space-frequency domain; and
   extrapolating the direct incident velocity data from the source acquisition surface to the data acquisition surface based on the direct incident pressure and velocity data in the space-frequency domain.

10. The system of claim 7, wherein calculating the source deghosted and designatured up-going pressure wavefield comprises:
    calculating a source deghosting and source designature operator from the direct incident down-going velocity wavefield; and
    multiplying the up-going pressure wavefield by the source deghosting and source designature operator to deconvolve source ghost effects and source signature effects from the up-going pressure wavefield.

11. The system of claim 10, wherein calculating the source deghosting and source designature operator further comprises:
    forming a matrix representation of the direct incident down-going velocity wavefield;
    calculating a complex conjugate of the matrix representation of the direct incident down-going velocity wavefield;
    transposing the complex conjugated matrix representation of the direct incident down-going velocity wavefield;
    calculating a product of the direct incident down-going velocity wavefield and the transposed complex conjugated direct incident down-going velocity wavefield;

calculating an inverse matrix of the product; and multiplying the matrix representation of the direct incident down-going velocity wavefield by the inverse matrix to generate the source deghosting and source designature operator.

12. The system of claim 7, wherein calculating a source deghosted and designatured up-going pressure wavefield comprises:

transforming the up-going pressure wavefield from the space-time domain to the source wavenumber-frequency domain;

transforming the direct incident down-going velocity wavefield from the space-time domain to the source wavenumber-frequency domain; and deconvolving the direct incident down-going velocity wavefield from the up-going pressure wavefield by spectral division to generate the source deghosted and source designatured up-going pressure wavefield.

13. A non-transitory computer-readable medium encoded with machine-readable instructions to control one or more processors of a computer system to perform the operations of calculating an up-going pressure wavefield from pressure data and vertical velocity data generated by receivers of a data acquisition surface in a marine survey of a subterranean formation;

calculating a direct incident down-going velocity wavefield from direct incident pressure and velocity data generated by receivers of a source acquisition surface;

calculating a source deghosted and designatured up-going pressure wavefield from the up-going pressure wavefield and the direct incident down-going velocity wavefield; and generating an image of the subterranean formation using at least in part the source deghosted and designatured up-going pressure wavefield.

14. The medium of claim 13, wherein calculating the up-going pressure wavefield comprises:

transforming the pressure data from the space-time domain to the wavenumber-frequency domain;

transforming the vertical velocity data from the space-time domain to the wavenumber-frequency domain;

calculating the up-going pressure wavefield from the pressure data and the vertical velocity in the wavenumber-frequency domain; and transforming the up-going pressure wavefield from the wavenumber-frequency domain to the space-time domain.

15. The medium of claim 13, wherein calculating the direct incident down-going velocity wavefield comprises:

transforming the direct incident pressure data from the space-time domain to the space-frequency domain;

transforming the direct incident velocity data from the space-time domain to the space-frequency domain; and extrapolating the direct incident velocity data from the source acquisition surface to the data acquisition surface based on the direct incident pressure and velocity data in the space-frequency domain.

16. The medium of claim 13, wherein calculating the source deghosted and designatured up-going pressure wavefield comprises:

calculating a source deghosting and source designature operator from the direct incident down-going velocity wavefield; and multiplying the up-going pressure wavefield by the source deghosting and source designature operator to deconvolve source ghost effects and source signature effects from the up-going pressure wavefield.

17. The medium of claim 16, wherein calculating the source deghosting and source designature operator comprises:

forming a matrix representation of the direct incident down-going velocity wavefield;

calculating a complex conjugate of the matrix representation of the direct incident down-going velocity wavefield;

transposing the complex conjugated matrix representation of the direct incident down-going velocity wavefield;

calculating a product of the direct incident down-going velocity wavefield and the transposed complex conjugated direct incident down-going velocity wavefield;

calculating an inverse matrix of the product; and multiplying the matrix representation of the direct incident down-going velocity wavefield by the inverse matrix to generate the source deghosting and source designature operator.

18. The medium of claim 13, wherein calculating a source deghosted and designatured up-going pressure wavefield comprises:

transforming the up-going pressure wavefield from the space-time domain to the source wavenumber-frequency domain;

transforming the direct incident down-going velocity wavefield from the space-time domain to the source wavenumber-frequency domain; and deconvolving the direct incident down-going velocity wavefield from the up-going pressure wavefield by spectral division to generate the source deghosted and source designatured up-going pressure wavefield.

19. A method of manufacturing a geophysical data product, the method comprising:

calculating an up-going pressure wavefield from pressure data and vertical velocity data obtained in a marine survey of a subterranean formation;

calculating a direct incident down-going velocity wavefield from direct incident pressure and velocity data;

calculating a source deghost and designatured up-going pressure wavefield from the up-going pressure wavefield and the direct incident down-going velocity wavefield;

generating an image of the subterranean formation using at least in part the source deghosted and designatured up-going pressure wavefield; and recording the image in a non-transitory computer readable medium.

* * * * *